United States Patent
Qi et al.

(10) Patent No.: US 11,157,837 B2
(45) Date of Patent: Oct. 26, 2021

(54) ADVANCED DETECTION OF RARE EVENTS AND CORRESPONDING INTERACTIVE GRAPHICAL USER INTERFACE

(71) Applicant: SAS Institute Inc., Cary, NC (US)

(72) Inventors: Yue Qi, Shanghai (CN); Jeffrey Todd Miller, Jr., Raleigh, NC (US); Thomas Francis Mutdosch, Raleigh, NC (US); Rory David Ness MacKenzie, Fenwick (GB); Iain Douglas Jackson, Glasgow (GB); Peter Rowland Eastwood, Cary, NC (US); Ryan Gillespie, Raleigh, NC (US); Adam Michael Ames, Holly Springs, NC (US); Andrew John Knotts, Glasgow (GB); Robert Wayne Thompson, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/530,041

(22) Filed: Aug. 2, 2019

(65) Prior Publication Data

US 2020/0042904 A1    Feb. 6, 2020

Related U.S. Application Data

(60) Provisional application No. 62/743,481, filed on Oct. 9, 2018, provisional application No. 62/713,716, filed on Aug. 2, 2018.

(51) Int. Cl.
*G06N 20/00* (2019.01)
*G06K 9/62* (2006.01)
(Continued)

(52) U.S. Cl.
CPC .......... *G06N 20/20* (2019.01); *G06K 9/6253* (2013.01); *G06K 9/6256* (2013.01); *G06K 9/6263* (2013.01); *G06N 3/088* (2013.01)

(58) Field of Classification Search
CPC ...... G06N 20/20; G06N 3/088; G06K 9/6253; G06K 9/6256; G06K 9/6263
See application file for complete search history.

(56) References Cited

U.S. PATENT DOCUMENTS 8,473,431 B1    6/2013   Mann et al.
8,595,154 B2    11/2013  Breckenridge et al.
(Continued)

FOREIGN PATENT DOCUMENTS

WO       2018075995       4/2018

OTHER PUBLICATIONS

Masud et al. ("Facing the reality of data stream classification: coping with scarcity of labeled data", Knowledge Information System, Oct. 2012, Issue 1, vol. 33, pp. 213-244) (Year: 2012).*

(Continued)

*Primary Examiner* — Kakali Chaki
*Assistant Examiner* — Robert Lewis Kulp
(74) *Attorney, Agent, or Firm* — Kilpatrick Townsend & Stockton LLP

(57) ABSTRACT

A system can obtain observations from a dataset. The system can generate a set of training partitions based on the observations and generate an ensemble of machine-learning models based on the set of training partitions. The system can then receive new data and detect whether the new data is indicative of the event using the ensemble. In some cases, the system can update the ensemble by providing the new data as input to an unsupervised machine-learning model that is separate from the ensemble of machine-learning models; receiving an output from the unsupervised machine-
(Continued)

learning model indicating whether or not the new data is indicative of the event; incorporating a new observation into the dataset indicating whether or not the new data is indicative of the event based on the output from the unsupervised machine-learning model; and updating the ensemble based on the dataset with the new observation.

30 Claims, 25 Drawing Sheets

(51) Int. Cl.
*G06N 3/08* (2006.01)
*G06N 20/20* (2019.01)

(56) References Cited

U.S. PATENT DOCUMENTS

| | | | |
|---|---|---|---|
| 9,269,095 | B1 | 2/2016 | Chan et al. |
| 2011/0173116 | A1* | 7/2011 | Yan .................. G06Q 10/067 705/38 |
| 2013/0031034 | A1 | 1/2013 | Gubin et al. |
| 2015/0379072 | A1 | 12/2015 | Dirac et al. |
| 2016/0063993 | A1 | 3/2016 | Dolan et al. |
| 2017/0169360 | A1* | 6/2017 | Veeramachaneni .................. G06N 3/0454 |
| 2017/0270435 | A1* | 9/2017 | Gallardo ............. G06F 30/20 |
| 2018/0039894 | A1 | 2/2018 | Farrell et al. |
| 2018/0060738 | A1 | 3/2018 | Achin et al. |
| 2018/0060759 | A1 | 3/2018 | Chu et al. |
| 2018/0191762 | A1 | 7/2018 | Bailey et al. |
| 2019/0370610 | A1* | 12/2019 | Batoukov .......... G06F 11/0709 |
| 2020/0097847 | A1* | 3/2020 | Convertino ........ G06F 11/3447 |

OTHER PUBLICATIONS

Cohn et al. ("Semi-supervised Clustering with User Feedback",Technical Report TR2003-1892, Cornell University, 2003, pp. 1-6) (Year: 2003).*
Soykan et al. ("Prediction of fishing effort distributions using boosted regression trees", Ecological Applications, vol. 24, Issue 1, 2014, pp. 71-83) (Year: 2014).*
Nils Weidmann ("Conflict Prediction via Machine Learning: Addressing the Rare Events Problem with Bagging", 25th Annual Summer Conference of the Society for Political Methodology, Jul. 9-12, 2008, University of Michigan, Ann Arbor, USA, poster, p. 1) (Year: 2008).*
Biau et al. ("Consistency of Random Forests and Other Averaging Classifiers", Journal of Machine Learning Research 9 (2008), pp. 2015-2033) (Year: 2008).*
Wayne Thompson ("Machine Learning Best Practices: Detecting Rare Events", https://web.archive.org/web/20170722142409/http://blogs.sas.com:80/content/subconsciousmusings/2017/07/19/machine-learning-best-practices-detecting-rare-events/, archive.org, Jul. 22, 2017) (Year: 2017).*
Wayne Thompson ("Machine Learning Best Practices: Combining Lots of Models", https://web.archive.org/web/20170731052358/https://blogs.sas.com/content/subconsciousmusings/2017/07/25/machine-learning-best-practices-combining-lots-models/, archive.org, Jul. 31, 2017) (Year: 2017).*
Samantha Duchscherer, ("Classifying Building Usages: A Machine Learning Approach on Building Extractions", Masters Thesis, University of Tennessee, Knoxville, May 2018, pp. 1-46) (Year: 2018).*
Tuv et al. ("Feature Selection Using Ensemble Based Ranking Against Artificial Contrasts", 2006 International Joint Conference on Neural Networks, Jul. 16-21, 2006, pp. 2181-2186) (Year: 2006).*
"A3S", SAS Institute Inc., 16 pages.
"Collaborative Data Science Development Platform to Turn Raw Data Into Predictions Quickly", Data Sheet, accessed via internet on Aug. 20, 2018 at www.dataiku.com, 9 pages.
"H2O Driverless AI", accessed via internet on Aug. 20, 2018 at https://www.h2o.ai/products/h2o-driverless-ai/, 6 pages.
"SAS Rapid Predictive Modeler: Predictive Modeling for Business Users", SAS Institute Inc., accessed via internet on Sep. 21, 2018 at https://www.sas.com/en_nz/software/analytics/rapid-predictive-modeler.html, 4 pages.
"Visual Machine Learning and Modeling in Dataiku", accessed via internet on Aug. 20, 2018 at https://www.dataiku.com/dss/features/machine-learning/, 5 pages.
Chinchilla , "Data Science in a Box With Dataiku", Hacker Noon, accessed via internet on Oct. 3, 2018 at https://hackernoon.com/data-science-in-a-box-with-dataiku-8ee10910fe79, 6 pages.
Fernandes et al., "A comprehensive survey on network anomaly detection", Telecommunication Systems, accessible via internet at https://rdcu.be/2WNT, Jul. 2018, 2 pages.
Gama et al., "Learning with Drift Detection", Intelligent Data Analysis, Sep. 2004, 12 pages.
Talwalkar et al., "MLbase: A Distributed Machine Learning Wrapper", Big Learning Workshop at NIPS, 2012, 8 pages.
Thompson et al., "Rapid Predictive Modeling for Customer Intelligence", SAS Institute Inc., SAS Global Forum, Customer Intelligence, 2010, 12 pages.

* cited by examiner

FIG. 12A — Table 1200a

| Variable X | Variable Y | Variable Z | Variable N | Noise Variable | Event? |
|---|---|---|---|---|---|
| EEE | 76 | 1.3 | 342 | 423 | 0 |
| BBB | 125 | 1.124 | 234 | 98 | 0 |
| YYY | 50 | 0.5 | 345 | 135 | 0 |
| AAA | 75 | 1.25 | 223 | 765 | 0 |
| ZZZ | 50 | 1.0 | 890 | 324 | 1 |
| CCC | 20 | 0.8 | 955 | 42 | 0 |
| DDD | 55 | 0.99 | 335 | 235 | 0 |
| XXX | 100 | 0.25 | 564 | 564 | 1 |

FIG. 12b — Table 1200b

| Variable X | Variable Y | Variable Z | Noise Variable | Event? |
|---|---|---|---|---|
| EEE | 76 | 1.3 | 423 | 0 |
| BBB | 125 | 1.124 | 98 | 0 |
| YYY | 50 | 0.5 | 135 | 0 |
| AAA | 75 | 1.25 | 765 | 1 |
| ZZZ | 50 | 1.0 | 324 | 0 |
| CCC | 20 | 0.8 | 42 | 0 |
| DDD | 55 | 0.99 | 235 | 1 |
| XXX | 100 | 0.25 | 564 | |

| Variable X | Variable Y | Variable Z | Event? |
|---|---|---|---|
| XXX | 100 | 0.25 | 1 |
| ZZZ | 50 | 1.0 | 1 |
| YYY | 50 | 0.5 | 0 |
| AAA | 75 | 1.25 | 0 |
| BBB | 125 | 1.124 | 0 |
| CCC | 20 | 0.8 | 0 |
| DDD | 55 | 0.99 | 0 |
| EEE | 76 | 1.3 | 0 |
| UUU | 71 | 1.4 | 0 |
| VVV | 33 | 0.75 | 0 |
| WWW | 67 | 0.89 | 0 |
| XXX | 24 | 1.21 | 0 |
| YYY | 78 | 0.89 | 0 |
| ZZZ | 107 | 0.254 | 0 |

Rows 1–2: Partition 0; Rows 3–8: Partition 1 (3:1 Ratio); Rows 9–14: Partition N (3:1 Ratio)

| Partition 0 | Event Segment 1 | Event Segment 2 | Event Segment 3 |
| --- | --- | --- | --- |
| | Observations 1-50 | Observations 51-100 | Observations 101-150 |

FIG. 16A

| Partition 2 | Non-Event Segment 1 | Non-Event Segment 2 | Non-Event Segment 3 |
| --- | --- | --- | --- |
| | Observations 1-50 | Observations 51-100 | Observations 101-150 |

FIG. 16B

1800 — The transaction is highly suspicious with an 80% probability of being fraudulent. The most important reason is that the debit percent change of the customer's account is 3.5%, and the weight of that reason is about 60%. The second reason is that the customer's account tenure (age) is less than 427 days old, and the weight of that reason is about 55%. The third reason is outgoing international wire activity of $125,400, and the weight of that reason is about 72%. The last reason is that the monthly transaction count is 30, and the weight of that reason is about 54%. There are 120 transactions in the training data that met all of these criteria, and about 64% of them are classified as true fraud.

FIG. 18

Projects

| Name | Table | Type | Target | Description | ID | Last Training Date | Last Trained By | Status |
|---|---|---|---|---|---|---|---|---|
| ☑ Project Five | Table Eleven | Machine Learning | Column Three | Lorem ipsum dolor sit amet, consectetuer adipiscing elit, sed... | Project_Five | Oct 24, 2017 4:53:37 PM | jconrad | |
| ☐ Project Four | Table One | Machine Learning | | Lorem ipsum dolor sit amet, consectetuer adipiscing elit | Project_Four | Oct 24, 2017 4:53:37 PM | jconrad | |
| ☐ Project One | Table Thirty Two | Machine Learning | Column Twenty Four | Lorem ipsum dolor sit amet, consectetuer adipiscing elit, sed... | Project_One | Oct 24, 2017 4:53:37 PM | jconrad | ○ Training |
| ☐ Project Three | Table Six | Scorecard | Column Eleven | Lorem ipsum dolor sit amet, consectetuer | Project_Three | Oct 24, 2017 4:53:37 PM | jconrad | |
| ☐ Project Two | Table Twenty | Machine Learning | Column Twelve | Lorem ipsum dolor sit amet, consectetuer adipiscing elit, sed... | Project_Two | Oct 24, 2017 4:53:37 PM | jconrad | ○ Training |

Project Six

① Table — ② Target — ③ Event Flag — ④ Model Properties

Select a table to analyze, or select other data sources.

Filter | Sort by name

- Table_Eight
  Size: 1,864 KB
  Last updated:
  Jul 12, 2017 2:14:42 PM

- Table_Eleven
  Size: 1,864 KB
  Last updated:
  Jul 12, 2017 2:14:42 PM

- Table_Five
  Size: 1,864 KB
  Last updated:
  Jul 12, 2017 2:14:42 PM

- Table_Four
  Size: 1,864 KB
  Last updated:

- Table_Nine
  Size: 1,864 KB
  Last updated:
  Jul 12, 2017 2:14:42 PM

- Table_One
  Size: 1,864 KB
  Last updated:
  Jul 12, 2017 2:14:42 PM

- Table_Seven
  Size: 1,864 KB
  Last updated:
  Jul 12, 2017 2:14:42 PM

- Table_Six
  Size: 1,864 KB
  Last updated:

- Table_Ten
  Size: 1,864 KB
  Last updated:
  Jul 12, 2017 2:14:42 PM

- Table_Thirteen
  Size: 1,864 KB
  Last updated:
  Jul 12, 2017 2:14:42 PM

- Table_Three
  Size: 1,864 KB
  Last updated:
  Jul 12, 2017 2:14:42 PM

- Table_Twelve
  Size: 1,864 KB
  Last updated:

- Table_Two
  Size: 1,864 KB
  Last updated:
  Jul 12, 2017 2:14:42 PM 2100, 2102

ADVANCED DETECTION OF RARE EVENTS AND CORRESPONDING INTERACTIVE GRAPHICAL USER INTERFACE

REFERENCE TO RELATED APPLICATION

This claims the benefit of priority under 35 U.S.C. § 119(e) to U.S. Provisional Patent Application No. 62/713,716 filed Aug. 2, 2018, and to U.S. Provisional Patent Application No. 62/743,481 filed Oct. 9, 2018, the entirety of each of which is hereby incorporated by reference herein.

TECHNICAL FIELD

The present disclosure relates generally to detecting rare events and a corresponding graphical user interface (GUI). More specifically, but not by way of limitation, this disclosure relates to an advanced process for detecting rare events and a corresponding graphical user interface.

BACKGROUND

A rare event is an event that occurs with very low frequency (e.g., less than 2% of the time). One example of a rare event may be a hacker attempting to obtain unauthorized access to a system, which may occur in less than 2% of cases in which users are attempting to obtain access to the system. Another example of a rare event may be fraud, which may occur less than 1% of the time. Yet another example of a rare event can be an electrical-grid malfunction. Often these rare events may go entirely unnoticed or unnoticed until it is too late, given the lack of adequate tools to detect them.

SUMMARY

One example of the present disclosure involves a system comprising a processor and a memory. The memory can include instructions that are executable by the processor for causing the processor to perform operations. The operations can include obtaining observations from a dataset, each observation including respective values for variables and a flag value corresponding to an event. The operations can include generating a set of training partitions based on the observations, the set of training partitions including an event partition having all of the observations in which the flag value indicates the event, and the set of training partitions including non-event partitions having all of the observations in which the flag value does not indicate the event, the non-event partitions being sized to have a substantially equal number of observations to one another. The operations can include generating an ensemble of machine-learning models based on the set of training partitions, each machine-learning model in the ensemble being generated using a respective set of training data formed from the event partition and one of the non-event partitions. The operations can include, subsequent to generating the ensemble of machine-learning models, receiving new data that is absent from the dataset. The operations can include detecting whether the new data is indicative of the event using the ensemble. This can involve providing the new data as input to the ensemble of machine-learning models; receiving respective scores associated with the new data as outputs from the machine-learning models in the ensemble; combining the respective scores into a single score for the new data; comparing the single score for the new data to a threshold level associated with the event; and outputting an indication to a user of whether the new data is indicative of the event. The operations can include, subsequent to detecting whether the new data is indicative of the event, update the ensemble. This can involve providing the new data as input to an unsupervised machine-learning model that is separate from the ensemble of machine-learning models; receiving an output from the unsupervised machine-learning model indicating whether or not the new data is indicative of the event; incorporating a new observation into the dataset indicating whether or not the new data is indicative of the event based on the output from the unsupervised machine-learning model; and updating the ensemble based on the dataset with the new observation.

Another example of the present disclosure can involve a method. The method can include obtaining observations from a dataset, each observation including respective values for variables and a flag value corresponding to an event. The method can include generating a set of training partitions based on the observations, the set of training partitions including an event partition having all of the observations in which the flag value indicates the event, and the set of training partitions including non-event partitions having all of the observations in which the flag value does not indicate the event, the non-event partitions being sized to have a substantially equal number of observations to one another. The method can include generating an ensemble of machine-learning models based on the set of training partitions, each machine-learning model in the ensemble being generated using a respective set of training data formed from the event partition and one of the non-event partitions. The method can include include, subsequent to generating the ensemble of machine-learning models, receiving new data that is absent from the dataset. The method can include detecting whether the new data is indicative of the event using the ensemble. This can involve providing the new data as input to the ensemble of machine-learning models; receiving respective scores associated with the new data as outputs from the machine-learning models in the ensemble; combining the respective scores into a single score for the new data; comparing the single score for the new data to a threshold level associated with the event; and outputting an indication to a user of whether the new data is indicative of the event. The method can include, subsequent to detecting whether the new data is indicative of the event, update the ensemble. This can involve providing the new data as input to an unsupervised machine-learning model that is separate from the ensemble of machine-learning models; receiving an output from the unsupervised machine-learning model indicating whether or not the new data is indicative of the event; incorporating a new observation into the dataset indicating whether or not the new data is indicative of the event based on the output from the unsupervised machine-learning model; and updating the ensemble based on the dataset with the new observation. Some or all of these method steps can be implemented by a processor.

Still another example of the present disclosure involves a non-transitory computer-readable medium comprising program code that is executable by a processor for causing the processor to perform operations. The operations can include obtaining observations from a dataset, each observation including respective values for variables and a flag value corresponding to an event. The operations can include generating a set of training partitions based on the observations, the set of training partitions including an event partition having all of the observations in which the flag value indicates the event, and the set of training partitions including non-event partitions having all of the observations in which the flag value does not indicate the event, the non-event partitions being sized to have a substantially equal number of observations to one another. The operations can include generating an ensemble of machine-learning models based on the set of training partitions, each machine-learning model in the ensemble being generated using a respective set of training data formed from the event partition and one of the non-event partitions. The operations can include, subsequent to generating the ensemble of machine-learning models, receiving new data that is absent from the dataset. The operations can include detecting whether the new data is indicative of the event using the ensemble. This can involve providing the new data as input to the ensemble of machine-learning models; receiving respective scores associated with the new data as outputs from the machine-learning models in the ensemble; combining the respective scores into a single score for the new data; comparing the single score for the new data to a threshold level associated with the event; and outputting an indication to a user of whether the new data is indicative of the event. The operations can include, subsequent to detecting whether the new data is indicative of the event, update the ensemble. This can involve providing the new data as input to an unsupervised machine-learning model that is separate from the ensemble of machine-learning models; receiving an output from the unsupervised machine-learning model indicating whether or not the new data is indicative of the event; incorporating a new observation into the dataset indicating whether or not the new data is indicative of the event based on the output from the unsupervised machine-learning model; and updating the ensemble based on the dataset with the new observation.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIGS. 12A-B depict an example of a dataset before and after trimming according to some aspects.

FIG. 13 depicts an example of partitioning observations according to some aspects.

FIGS. 16A-B depicts an example of segmenting partitions according to some aspects.

FIG. 18 depicts an example of a natural-language textual explanation according to some examples.

FIG. 20 depicts an example of a page in an interactive graphical user interface (GUI) in which a user can begin a new project according to some aspects.

FIG. 21 depicts an example of another page in the interactive GUI in which the user can make a data selection according to some aspects.

FIG. 24 depicts an example of another page in the interactive GUI in which the user can set various settings for generating a machine-learning model to detect the particular event according to some aspects.

Figure 1:
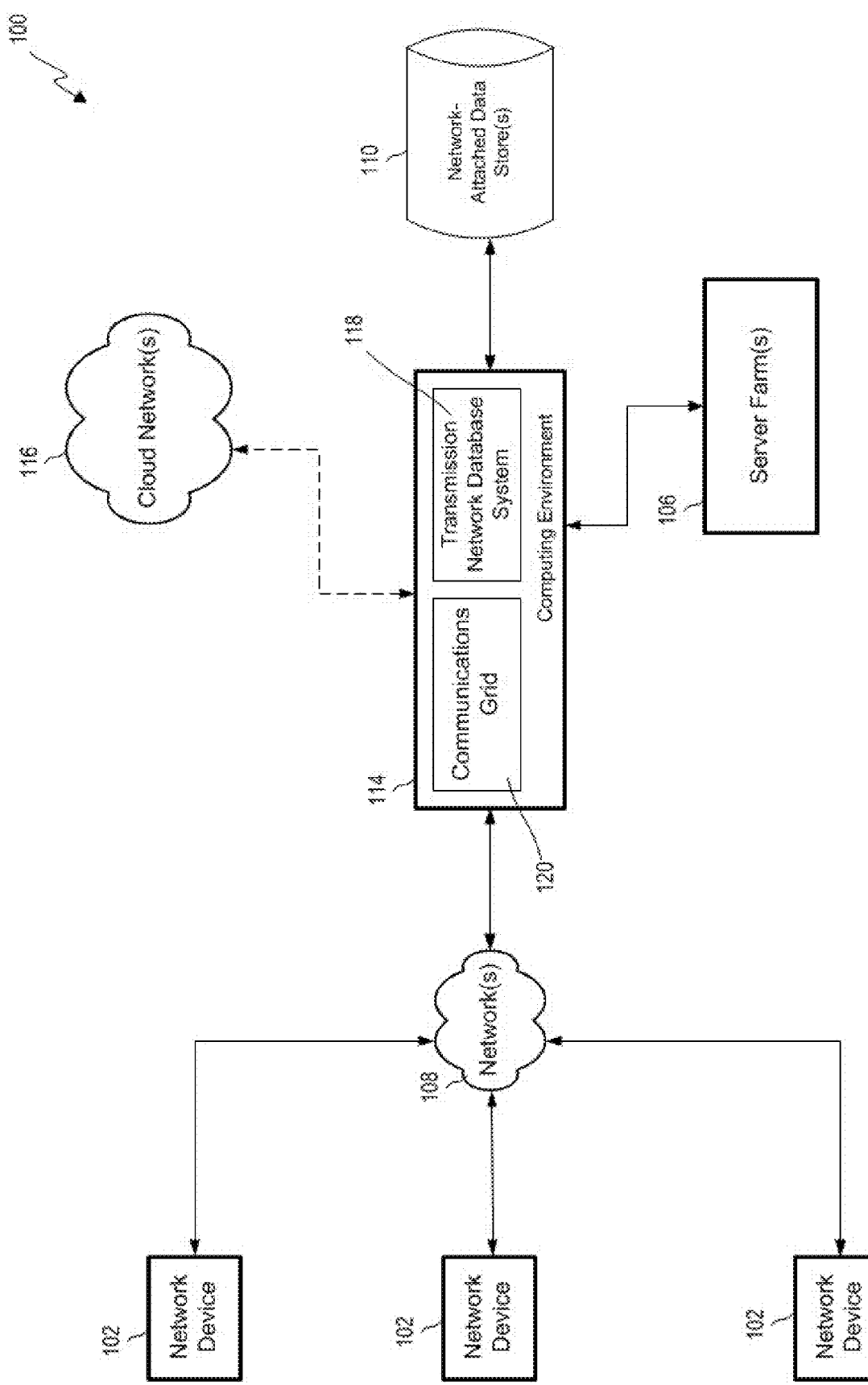
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to an advanced process for detecting rare events and a corresponding graphical user interface (GUI) for customizing and simplifying the process. The advanced process can yield an ensemble of machine-learning models that can more accurately detect a desired type of rare event, such as a cyber-attack, than is otherwise possible using conventional approaches. And the GUI can provide an interactive experience through which non-technical users to quickly and easily customize and execute the advanced process to generate the ensemble of machine-learning models. For example, the GUI can involve a series of pages that guide inexperienced users and enable them to rapidly deploy the ensemble of machine-learning models where prior technology did not enable them to do so.

More specifically, in some examples the advanced process can begin by a processor receiving a selection of a rare event and obtaining observations from historical data related to the rare event. The processor can then process the obtained observations at least in part by removing extraneous variable values from those observations (e.g., to produce trimmed observations). For example, the processor may determine using a decision tree that only a subset of the variables meaningfully contribute to detecting the selected rare event. So, the processor may maintain those meaningful variables in the obtained observations and remove the remaining extraneous variables. Removing this extraneous information from the observations can significantly speed up processing of the observations in subsequent steps.

The processor can next generate a set of partitions by grouping the (trimmed) observations into the partitions. The set of partitions can include an event partition containing all of the observations indicative of the event. An observation indicative of the event can be referred to as an event observation. The set of partitions can also include multiple non-event partitions that collectively contain all of the observations that are not indicative of the event. An observation that is not indicative of the event can be referred to as a non-event observation. The processor can generate the set of partitions such that the non-event partitions have a particular ratio of observations relative to the event partition. For example, the non-event partitions can each have five times as many observations as the event partition. Keeping this ratio relatively small (e.g., less than 7:1) can result in the event observations being significantly "less rare" as compared to the non-event observations, which can help mitigate bias in the ensemble that could otherwise result due to the extremely large imbalance between the event observations and non-event observations that is typical of rare events.

The processor can next generate the ensemble of machine-learning models based on the set of partitions. For example, the processor can automatically determine optimal values for hyperparameters associated with the machine-learning models based on the set of partitions. The processor can then configure the machine-learning models with those optimal values. Additionally, each machine-learning model in the ensemble can be trained using a unique set of training data formed from a unique pair of partitions in the set of partitions. Generating the ensemble of machine-learning models in this manner can enable it to more accurately detect the selected type of rare event than is otherwise possible using conventional approaches, which fail to account for extraneous variables in the historical data and the large observation imbalance that is typical of rare events. The ensemble can then be deployed to a production environment, where it can be applied to new data to detect whether the new data is indicative of the selected type of rare event.

As mentioned above, this advanced process can be controlled and customized via an interactive GUI in some examples. The interactive GUI can enable a user to quickly and easily select a rare event for detection, select the appropriate historical dataset, customize the complexity of the machine-learning models to be generated, customize a threshold level for detecting the rare event, and generate and deploy the machine-learning models in an ensemble, all with minimal knowledge about the inner workings of the process and minimal technical experience. The interactive GUI can also output performance metrics for the ensemble and describe the performance metrics in an intuitive manner, such as with a natural-language textual description, so that the performance metrics can be easily understood and any adjustments to the ensemble can be easily made. This GUI features purposefully conceal the complexities of the underlying process to provide a more accurate solution that is accessible to the average user.

The above examples are given to introduce the reader to the general subject matter discussed here and are not intended to limit the scope of the disclosed concepts. For instance, although various concepts are described above in relation to rare events, it should be understood that they can also apply to other types of events, including events that are not rare.

The following sections describe various additional features and examples with reference to the drawings in which like numerals indicate like elements but, like the illustrative examples, should not be used to limit the present disclosure.

FIGS. 1-10 depict examples of systems and methods usable for an advanced process for detecting rare events according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use an advanced process for detecting rare events, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for an advanced process for detecting rare events to a network-attached data store 110 for storage. The computing environment 114 may later retrieve the data from the network-attached data store 110 and use the data to implement an advanced process for detecting rare events.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the server farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for an advanced process for detecting rare events.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (loT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for an advanced process for detecting rare events. For example, the computing environment 114, a network device 102, or both can implement one or more versions of the processes discussed with respect to any of the figures.

Figure 2:
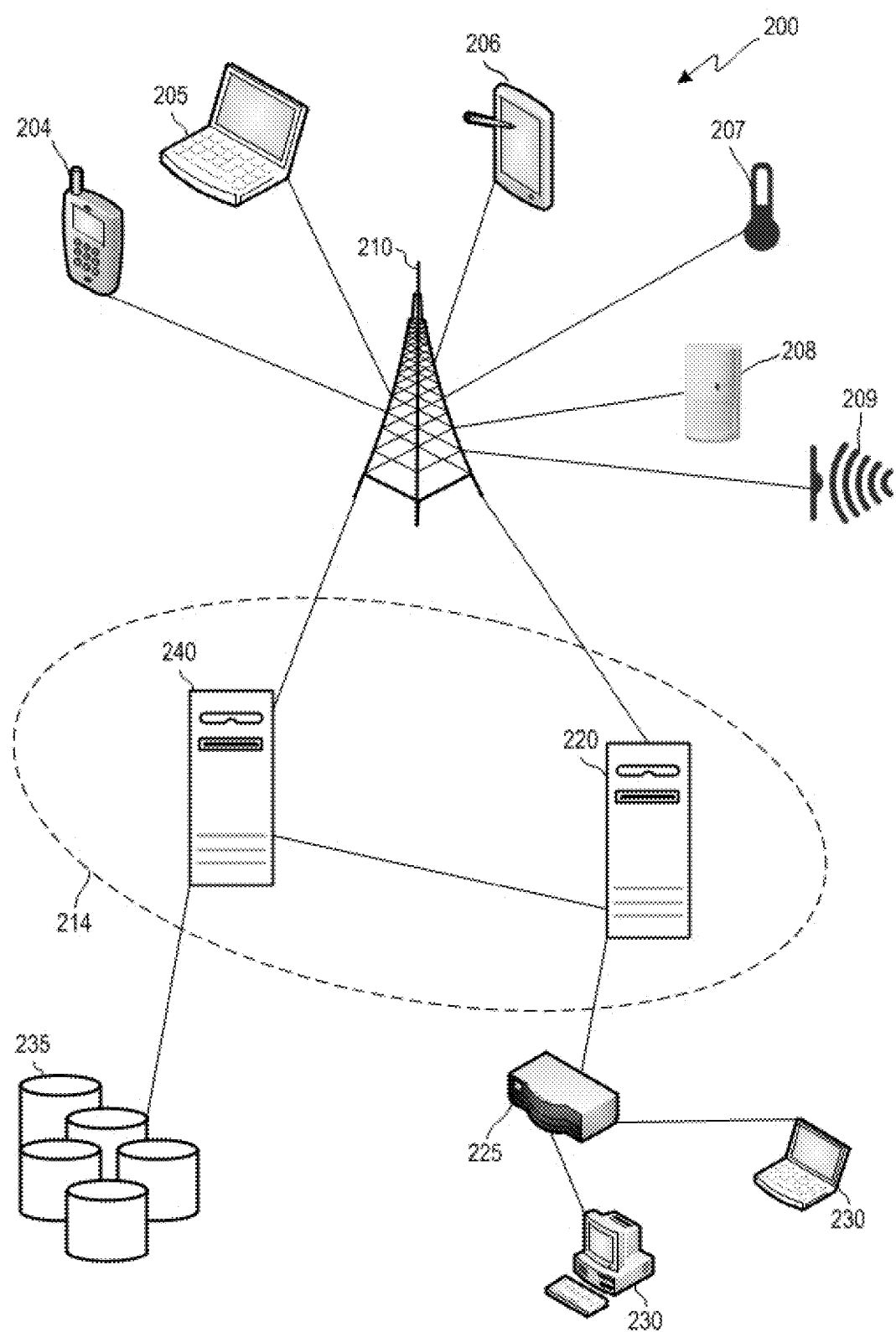
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to detect rare events).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which rare events are to be detected from data, the computing environment 214 can perform a pre-analysis of the data. The pre-analysis can include determining whether the data is in a correct format for an advanced process for detecting rare events using the data and, if not, reformatting the data into the correct format.

Figure 3:
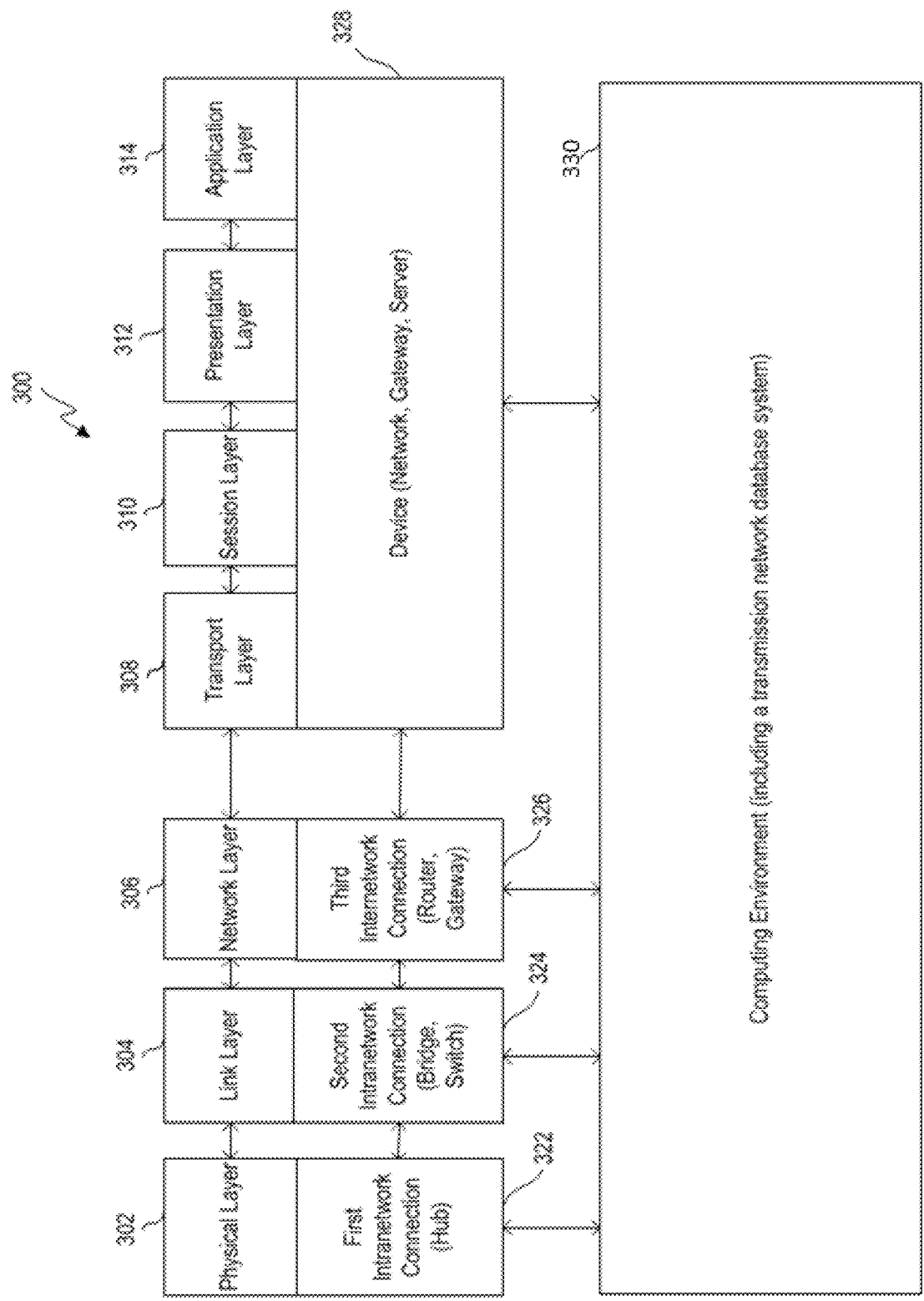
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a dataset to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for detecting rare events, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for detecting rare events.

Figure 4:
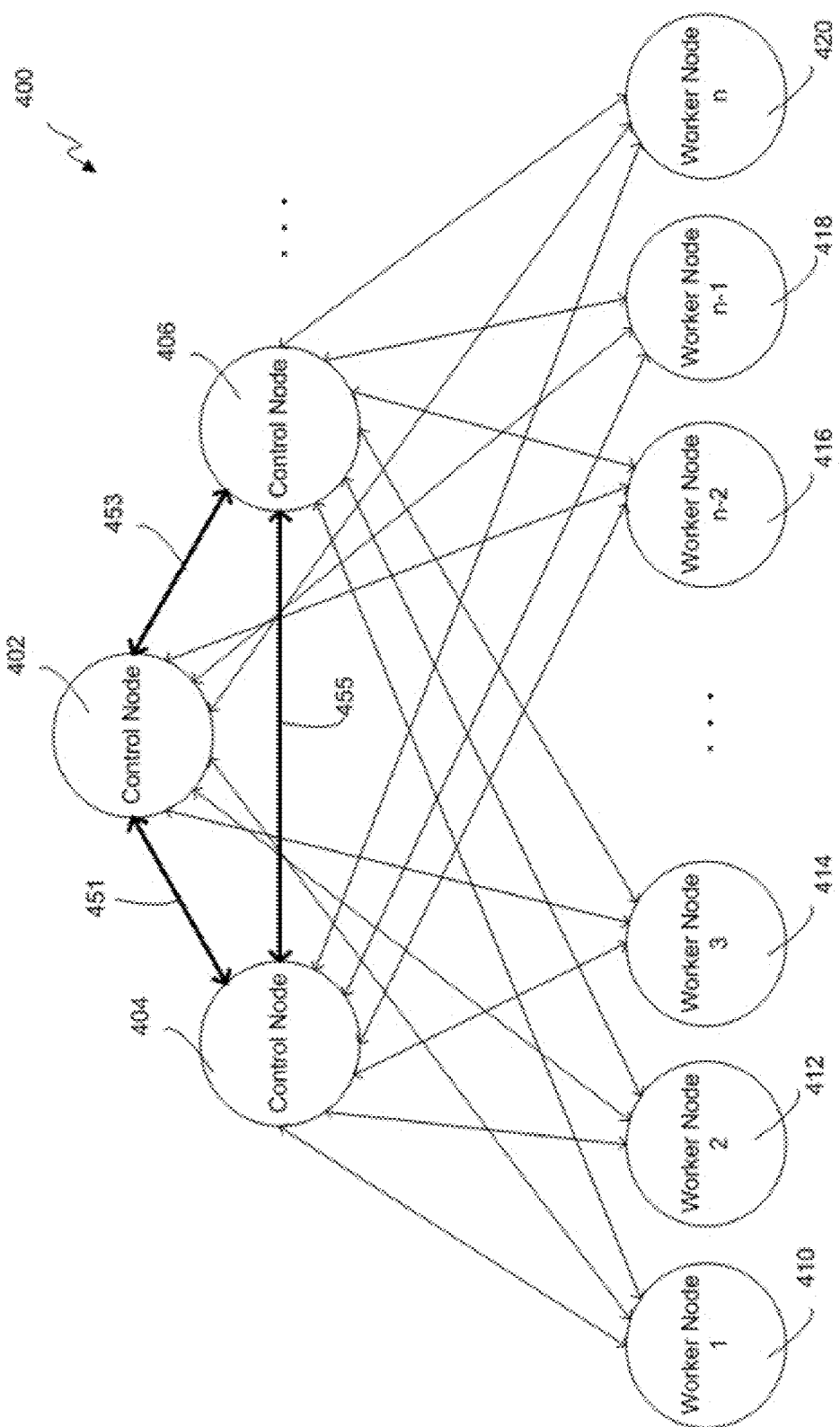
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or dataset is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to detecting rare events. The project may include the dataset. The dataset may be of any size and can include a time series. Once the control node 402-406 receives such a project including a large dataset, the control node may distribute the dataset or projects related to the dataset to be performed by worker nodes. Alternatively, for a project including a large dataset, the dataset may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for detecting rare events can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may automatically detect rare events using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used in an advanced process for detecting rare events.

Figure 5:
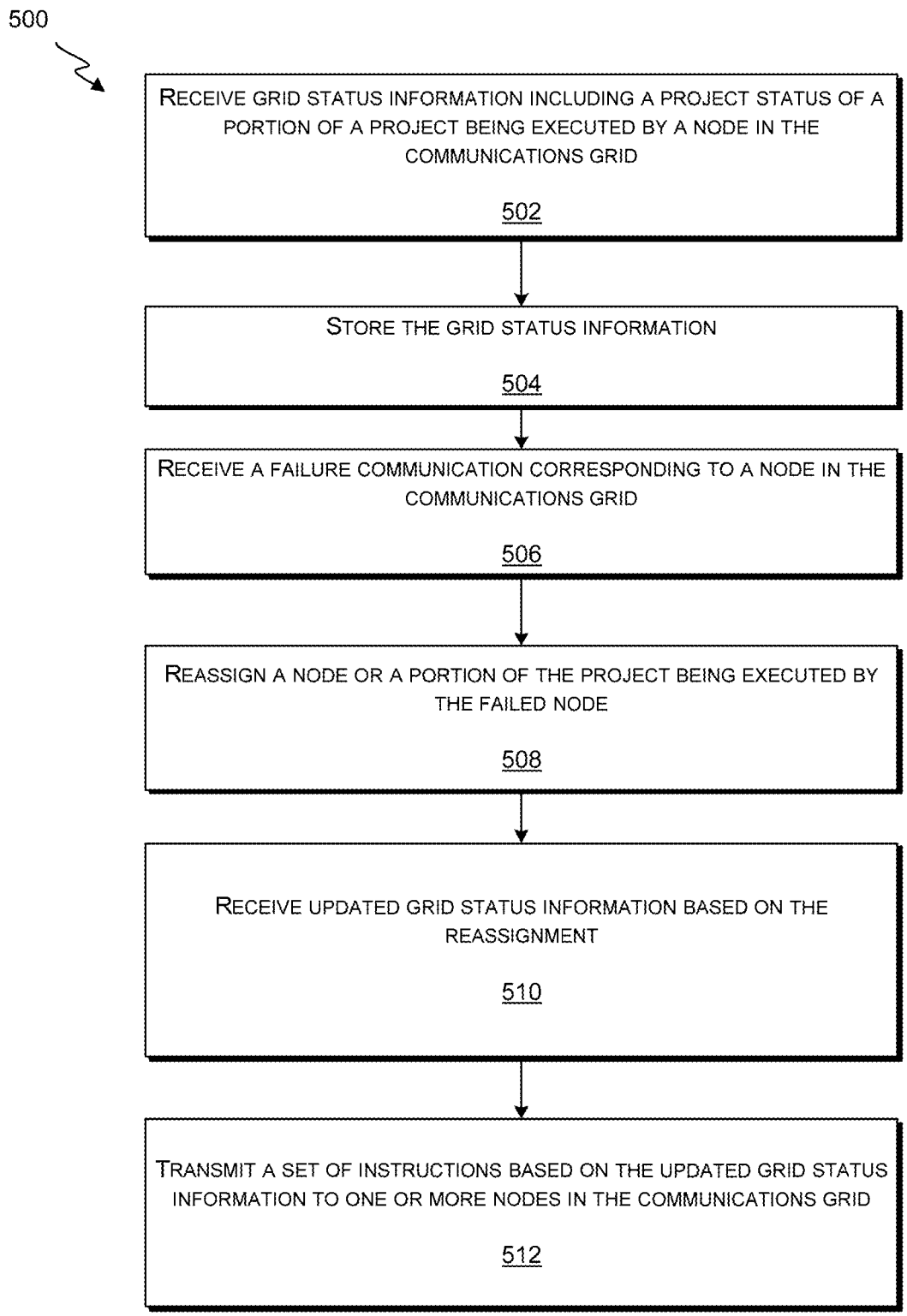
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
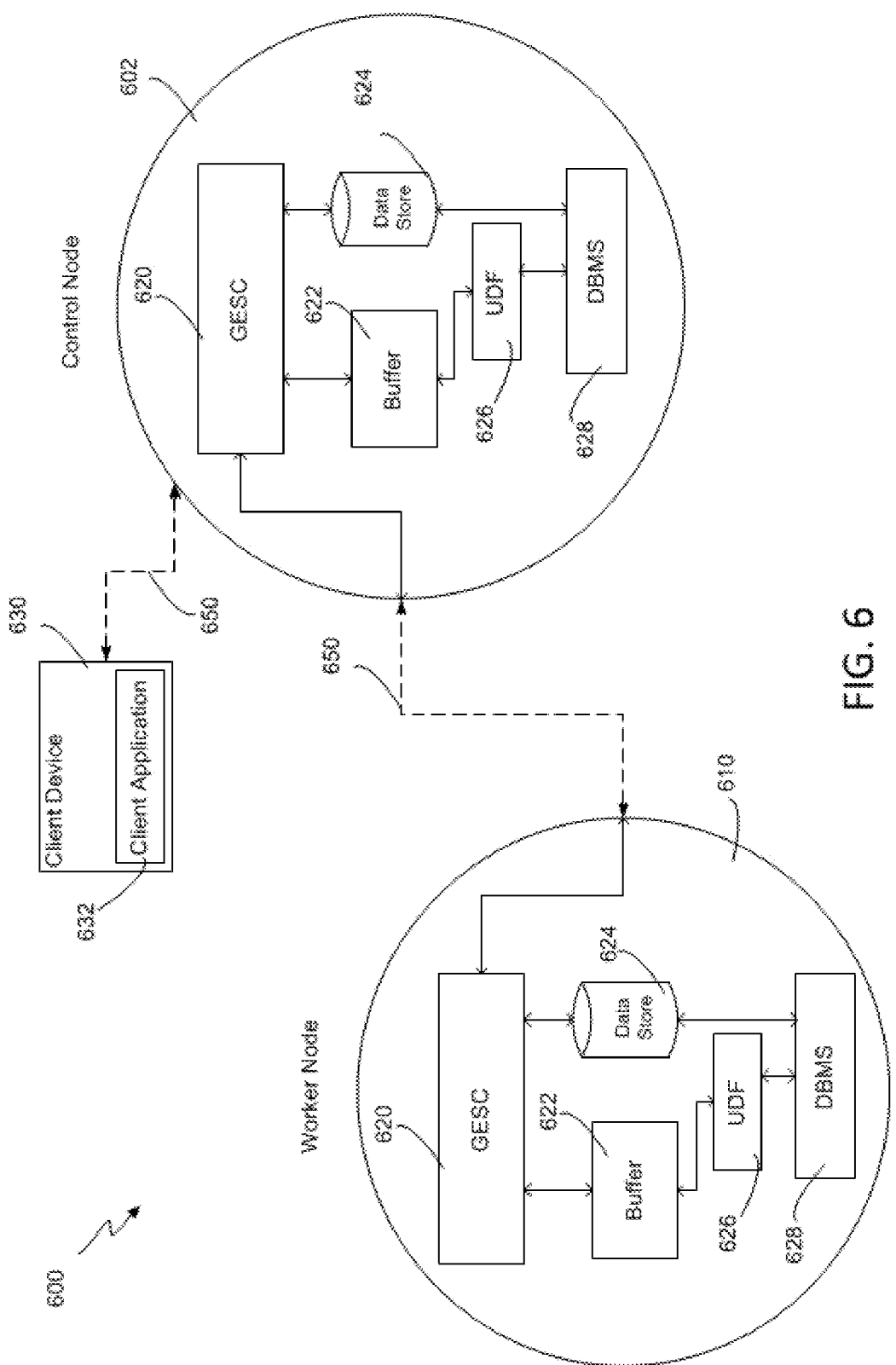
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
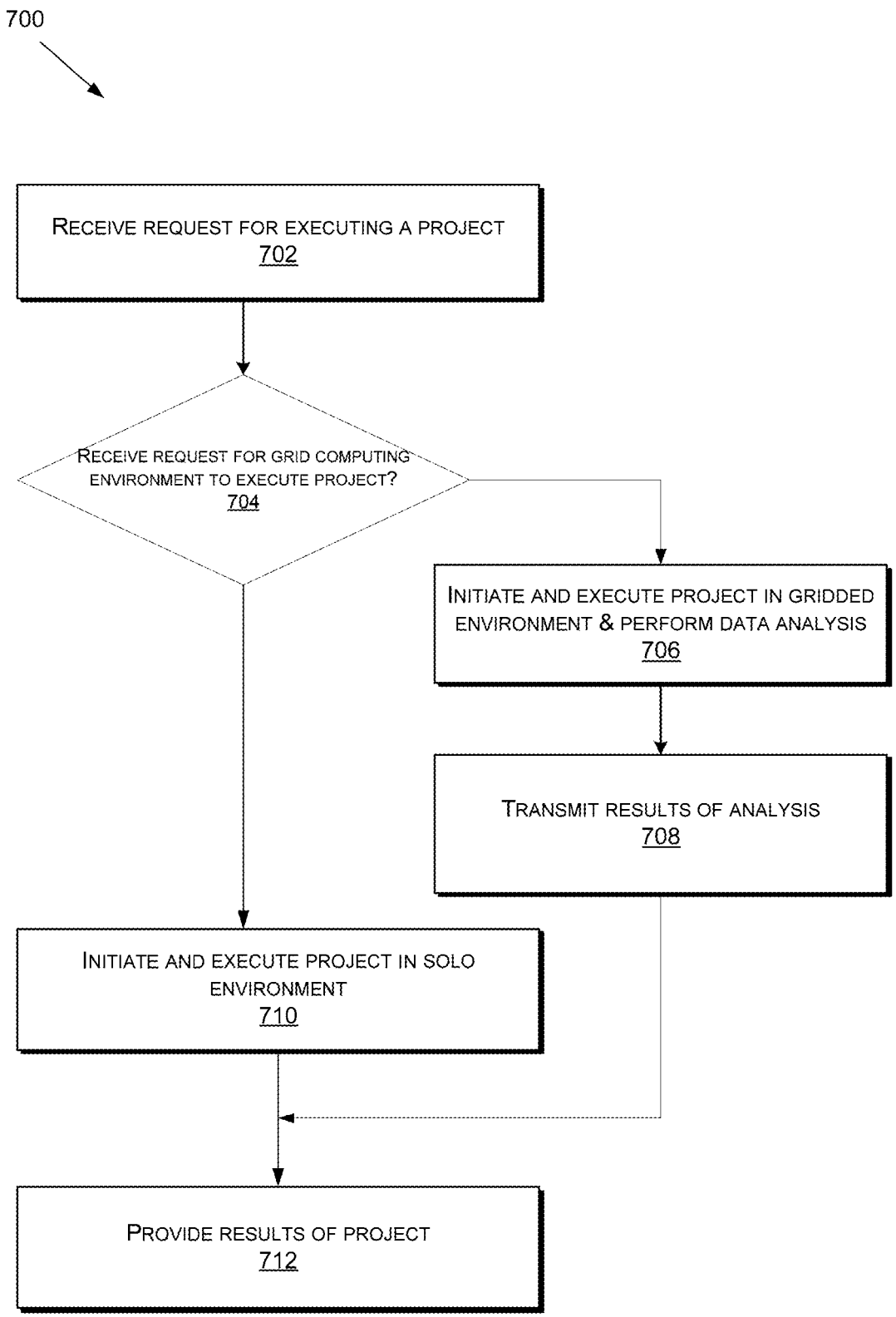
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
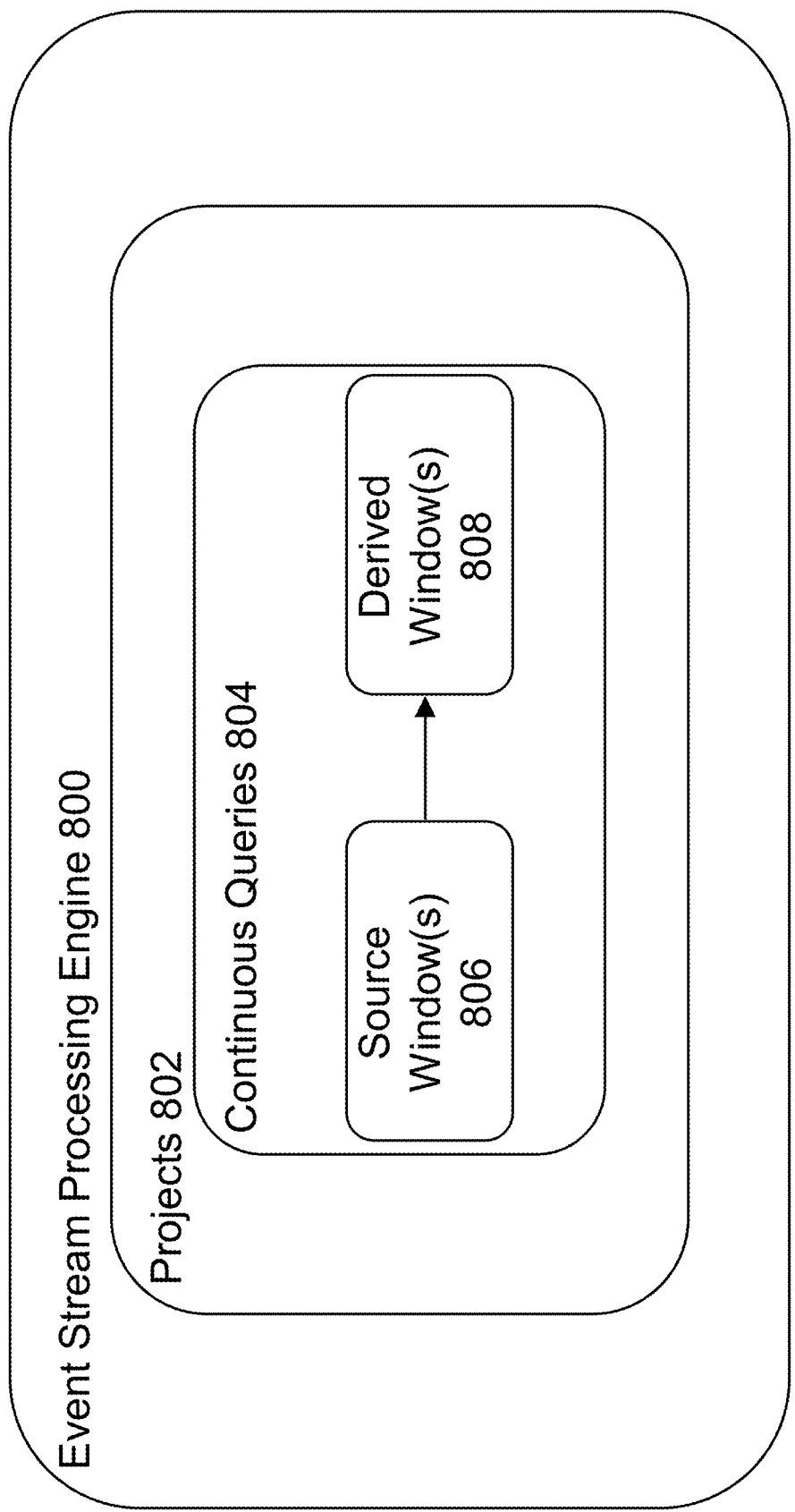
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
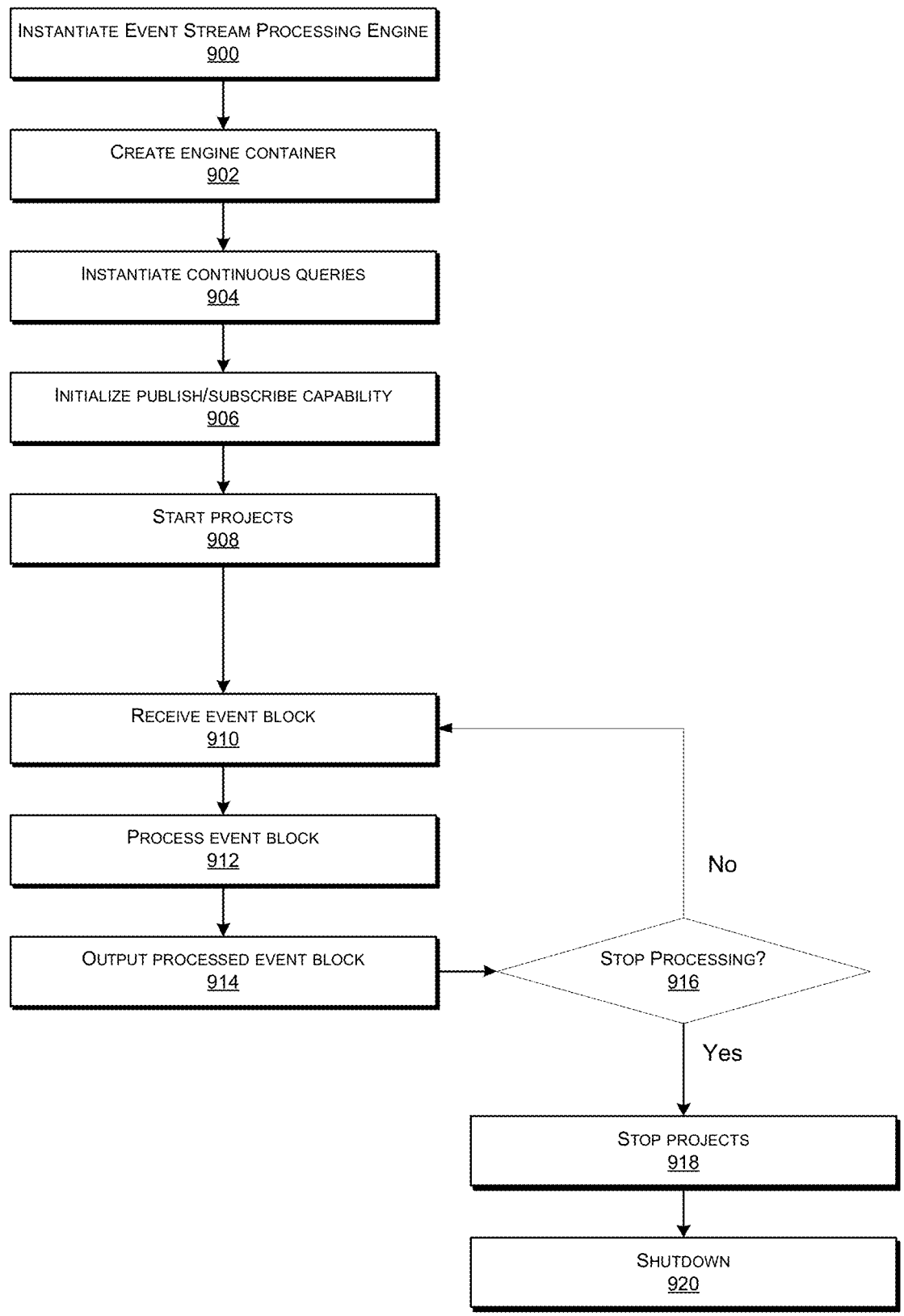
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
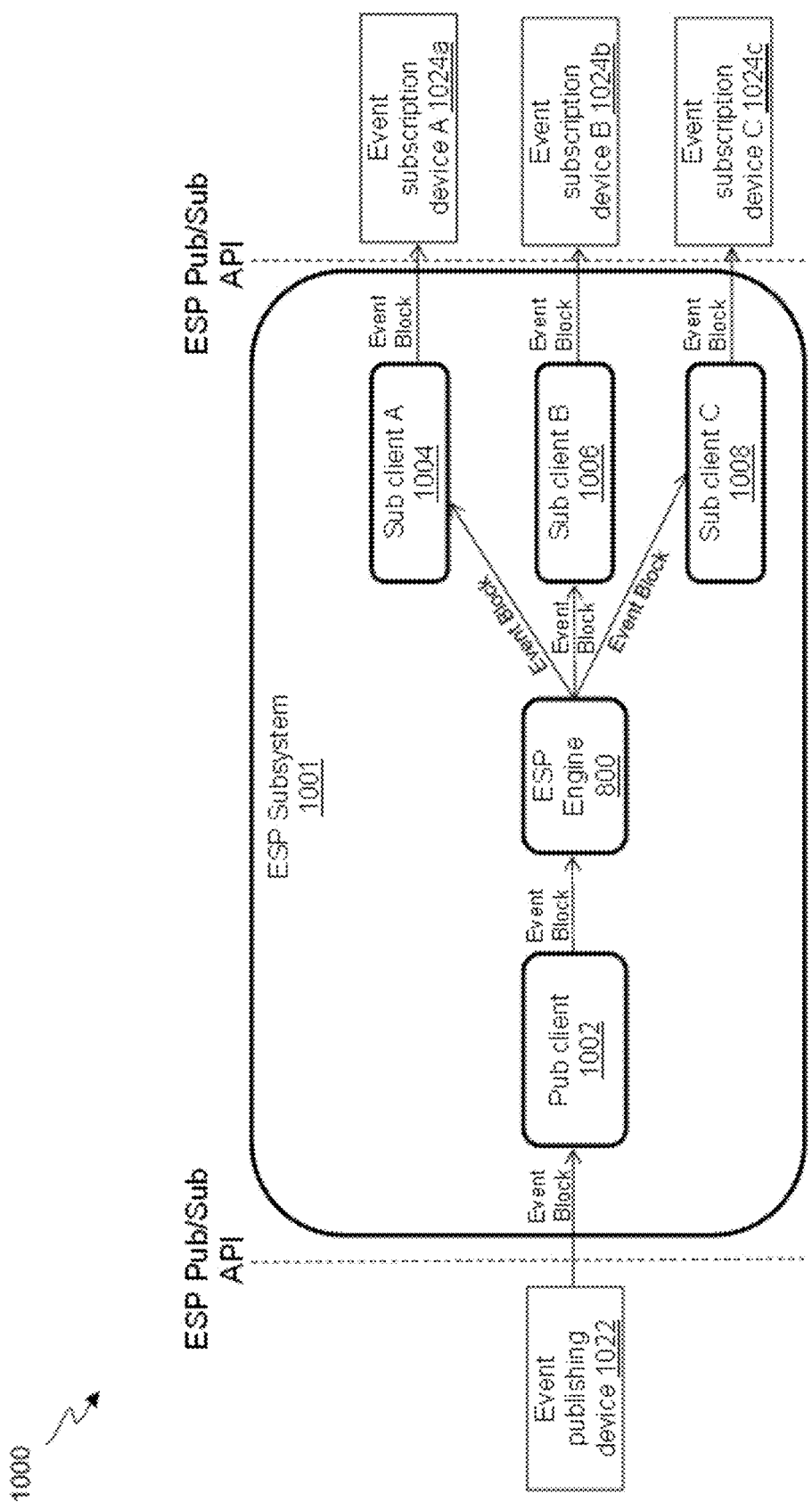
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
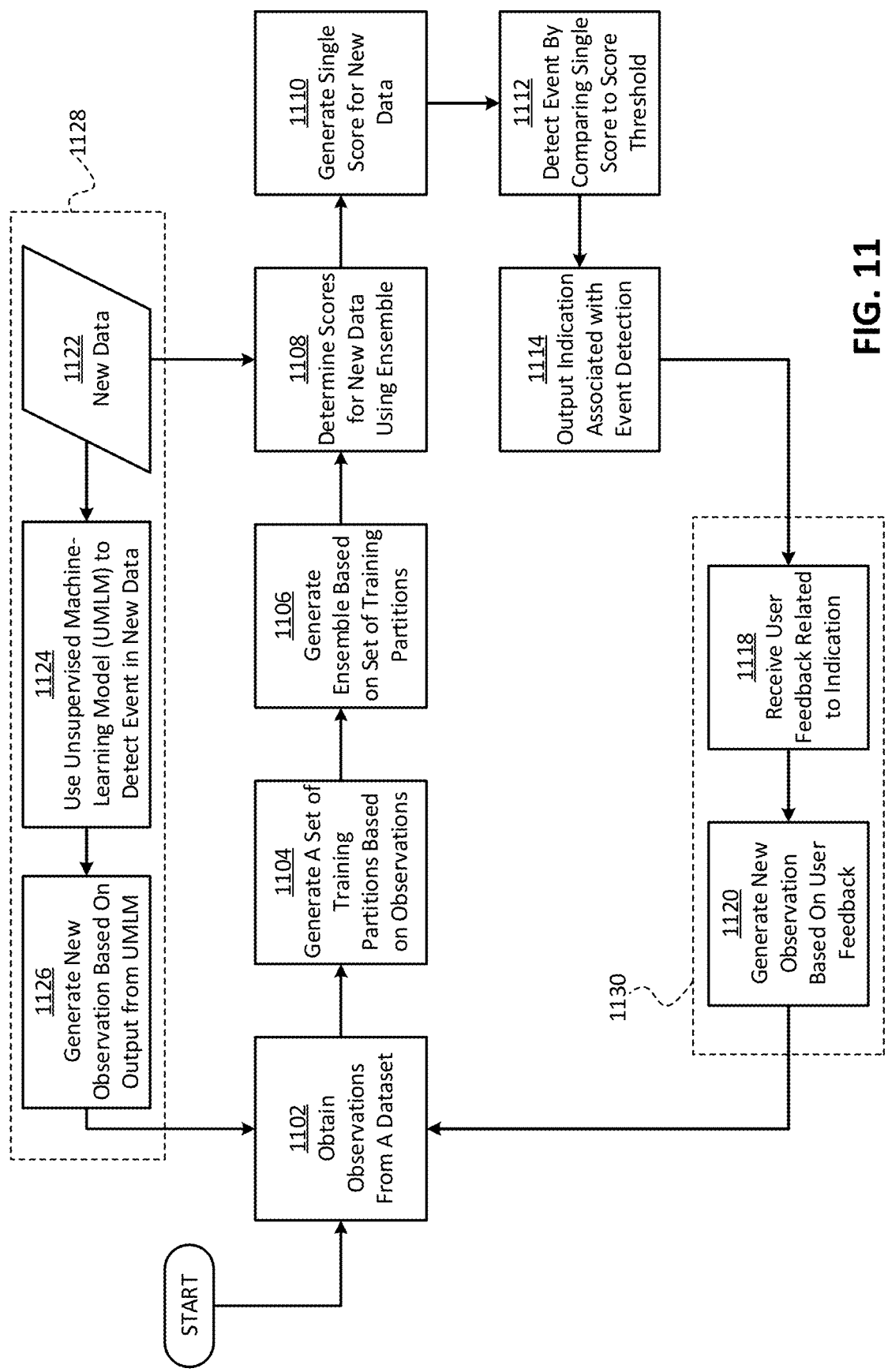
FIG. 11 depicts an example of a process for advanced detection of rare events according to some aspects.

FIG. 11 depicts an example of a process for advanced detection of rare events according to some aspects. The process of FIG. 11 can be implemented using any of the systems and processes discussed above in relation to FIGS. 1-10. Other examples can involve more operations, fewer operations, different operations, or a different order of the operations than those shown in FIG. 11.

It will be appreciated that prior to starting the process of FIG. 11, a dataset (e.g., historical data) will have been gathered relating to an event to be detected by the system. The dataset may have been collected during a prior timespan and include a series of entries, which can be referred to as "observations." Each of the observations can include values for variables and a flag value indicating whether or not the variable values indicate the event. As one particular example, each observation in the dataset can include information about a connection attempt to a computer system by a user. The information can values for a group of variables, such as a bandwidth usage amount, an internet protocol address, an originating location, a number of incorrect login attempts, etc., associated with the connection attempt. Each observation can also include a flag value indicating whether or not the connection attempt was malicious in nature. A flag value of 1 may indicate that the connection attempt was malicious, while a flag value of 0 may indicate that the connection attempt was benign. The dataset may have thousands or millions or such observations. In some cases, only a small portion (e.g., less than 2%) of these observations may indicate that the event occurred, in which can the event would be classified as a "rare event." Having collected the observations in the dataset, the process can begin at operation 1102.

At operation 1102, a processor obtains observations from the dataset. This may involve selecting all of the observations in the dataset or just a subset of the observations in the dataset.

In some examples, the obtained observations may be processed prior to use. This processing can include removing extraneous variable values from the selected observations. For example, the processor may determine that only a subset of the variables meaningfully contribute to detecting whether or not the event occurred, and thus may maintain only those meaningful variables in the selected observations and remove the remaining extraneous variables. One example of this process is described below in relation to FIGS. 12A-B.

FIG. 12A depicts an example of selected observations prior to trimming according to some aspects. This is just a small subset of the selected observations for exemplary purposes, but typically the selected observations may include thousands or millions of observations. The selected observations are depicted in a table 1200*a* in which each row corresponds to an observation. Each observation has values for various variables (e.g., Variables X, Y, Z, and N) along with a flag value indicating whether or not the variable values signify a particular event, such as a cyber-intrusion event. The variable values can include letters, numbers, special characters, or any combination of these (e.g., the variable values can be alphanumeric).

To determine which of these variables is important for detecting the event, the processor can also add a noise value for a noise variable to each observation. The noise values are not present in the original dataset, but rather are added by the processor after the dataset has been collected. The processor can then generate a decision tree using the dataset with the noise values. In some examples, the processor can create the decision tree using an Iterative Dichotomiser 3 (D3) algorithm, for which information gain is a metric. The processor can then use the decision tree to determine the information gain that is attributable to each of the variables. If a particular variable provides more information gain than the noise variable, the processor can determine that the particular variable is important for detecting the event and maintain that variable's information in the selected observations. Conversely, if a particular variable provides less information gain than the noise variable, the processor can determine that the particular variable is unimportant for detecting the event, and the processor can remove that variable's information from the selected observations. For example, FIG. 12B depicts a table 1200*b* in which values for Variable N have been trimmed (e.g., removed) from the selected observations based on the processor determining that Variable N is extraneous. Removing this extraneous information from the selected observations can significantly speed up processing of the observations in subsequent steps.

Referring back to FIG. 11, the process can next continue to operation 1104. At operation 1104, the processor generates a set of training partitions by dividing the determined observations into the partitions, with each partition containing just a subset of the determined observations. The processor can generate the set of training partitions to include an event partition containing all of the observations with a flag value indicating the event, and multiple non-event partitions that collectively contain all of the observations with a flag value that does not indicate the event. One example of this process is shown in FIG. 13. As shown, the processor can generate a single event partition (e.g., Partition 0) having all of the observations with a flag value of 1, and a multitude of non-event partitions (e.g., Partitions 1-N) that collectively have all of the observations with a flag value of 0.

In some examples, the processor can generate the non-event partitions such that they all have a substantially equal number of observations to one another. Two non-event partitions have a "substantially equal number of observations" if they have an exactly equal number of observations to one another or are within two observations of one another. For example, all of the non-event partitions 1-N in FIG. 13 contain 6 observations. Configuring all of the non-event partitions to have a substantially equal number of observations can help ensure that machine-learning models generated in later operations (discussed below) are trained using a roughly equal amount of training data, which can be important when comparing their accuracies to one another.

In some examples, the processor can generate the non-event partitions to have a particular ratio of observations relative to the event partition. For example, the processor can determine that each of the non-event partitions is to have three times as many observations as the event partition (e.g., a ratio of 3:1). The processor can use this ratio in combination with the amount of observations in the event partition to determine how many non-event partitions to create. In some cases, the ratio can be selected to help manage the imbalance between observations indicating the event and observations not indicating the event. This imbalance can be extremely large when the event is a rare event, since there are comparatively few event observations. This large imbalance can undesirably bias the machine-learning models generated in later operations. To help avoid or mitigate this bias, the ratio to be limited to at most 7:1. This can result in the event observations being significantly "less rare" (e.g., more frequent) in relation to the non-event observations in each non-event partition.

Returning to FIG. 11, the process can next continue to operation 1106, in which the processor generates an ensemble of machine-learning models based on the set of training partitions. Non-limiting examples of a machine-learning model can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; and (v) factorizers, such as factorization machines, principal component analyzers and kernel principal component analyzers. An ensemble is a group of two or more machine-learning models that work together to determine a result. An ensemble typically yields more accurate results than its constituent machine-learning models are capable of providing individually.

Figure 14A:
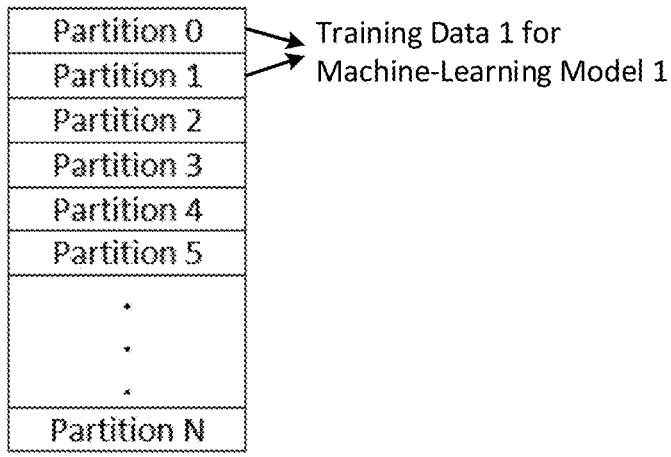
FIGS. 14A-C depict examples of generating training data for machine-learning models according to some aspects.
Figure 14B:
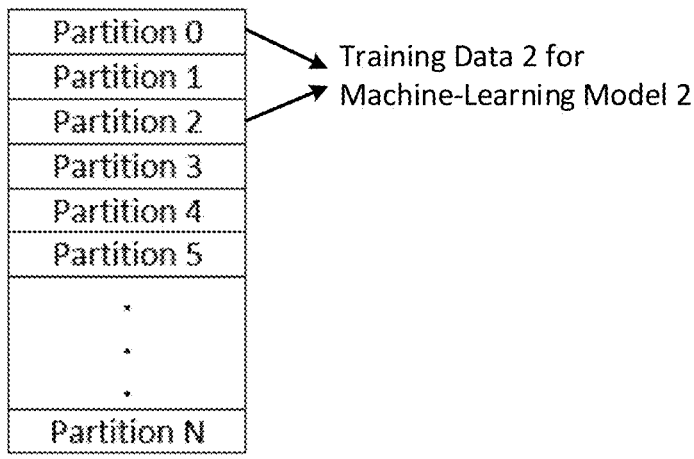
Figure 14C:
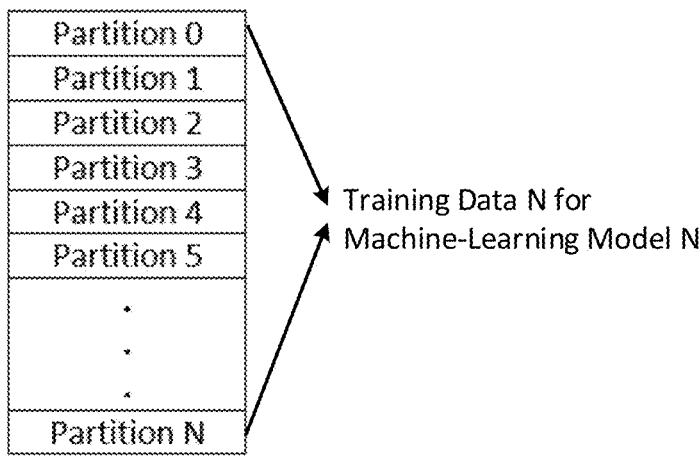

In some examples, the ensemble can include at least as many machine-learning models as there are partitions in the set of training partitions. For example, if there are N partitions in the set of training partitions, the processor can generate at least N machine-learning models. Each machine-learning model can be generated using a respective set of training data formed from the event partition and one of the non-event partitions. One example of this process is shown in FIGS. 14A-C. As shown in FIG. 14A, the processor can generate a first set of training data ("Training Data 1") for training a first machine-learning model ("Machine-Learning Model 1"), where the first set of training data is formed from the observations in Partition 0 and Partition 1. Partition 0 can be the event partition and Partition 1 can be one of the non-event partitions. The processor can then train the first machine-learning model using the first set of training data. As shown in FIG. 14B, the processor can generate a second set of training data ("Training Data 2") for training a second machine-learning model ("Machine-Learning Model 2"), where the second set of training data is formed from the observations in Partition 0 and Partition 2. Partition 0 can be the event partition and Partition 2 can be one of the non-event partitions. The processor can then train the second machine-learning model using the second set of training data. This process can be repeated for all N partitions, such that an $N^{th}$ machine-learning model ("Machine-Learning Model N") is trained using an $N^{th}$ set of training data ("Training Data N") formed from the observations in Partition 0 and Partition N, as shown in FIG. 14C. At the end of this process, there can be N machine-learning models that collectively form the ensemble.

Figure 15:
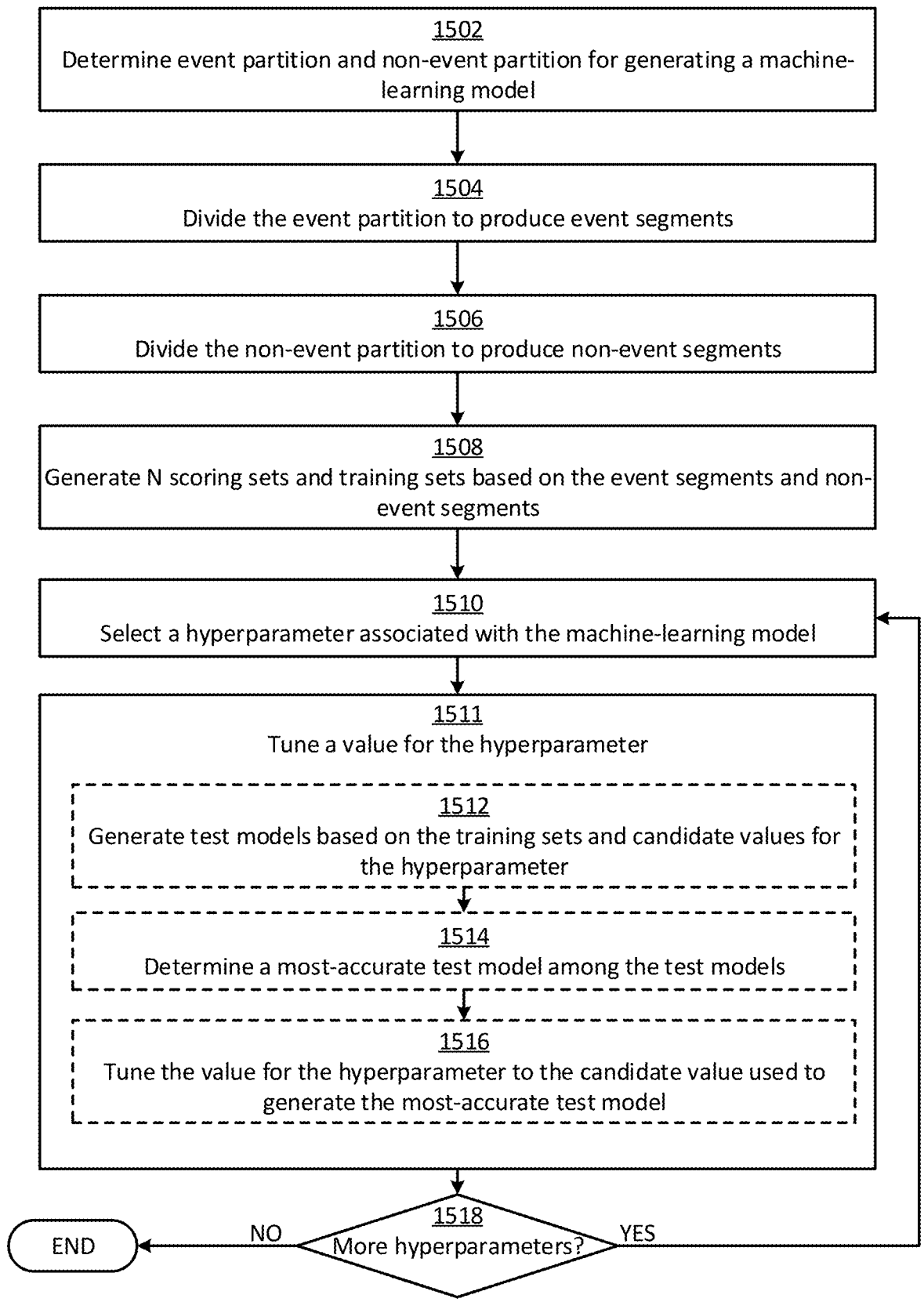
FIG. 15 depicts an example of a process for hyperparameter selection according to some aspects.

In some examples, generating the ensemble of machine-learning models can involve setting hyperparameter values for hyperparameters of the machine-learning models. The hyperparameter values can be selected manually by a user or selected automatically by the processor. In one example, the processor can determine an optimal value for one or more hyperparameters by executing the process shown in FIG. 15, as described below.

At operation 1502, the processor determines the event partition and the non-event partition that will form the training data for a particular machine-learning model in the ensemble. For example, the event partition may be Partition 0 and the non-event partition may be Partition 1 in FIG. 14B discussed above.

At operation 1504, the processor divides the event partition into a predefined number of segments (e.g., groups) to produce event segments. The predefined number of segments can be set by a user or a default value. For example, the processor can divide the event partition into three event-segments, with each event segment having a substantially equal number of observations to the other event-segments. An example of this is shown in FIG. 16A, in which the event partition (Partition 0) with 150 total observations has been divided into three event-segments.

At operation 1506, the processor divides the non-event partition into the predefined number of segments to produce non-event segments. For example, the processor can divide the non-event partition into three non-event segments, with each non-event segment having a substantially equal number of observations to the other non-event segments. An example of this is shown in FIG. 16B, in which the non-event partition (Partition 2) with 150 total observations has been divided into three non-event segments.

At operation 1508, the processor generates N scoring sets and training sets based on the event segments and the non-event segments. N can be a default number or a number input by the user. Each scoring set can include at least one of the event segments and one of the non-event segments. For example, the processor can generate a scoring set that includes event segment 1 and non-event segment 1 from FIGS. 16A-B. The processor can generate another scoring set that includes event segment 1 and non-event segment 2 from FIGS. 16A-B. The processor can generate yet another scoring set that includes event segment 1 and non-event segment 3 from FIGS. 16A-B. This processor can iterate this to create N scoring sets covering various combinations of one event-segment and one non-event segment.

Each training set can correspond to a scoring set and include a remainder of the event segments and the non-event segments that were not used to generate the scoring set. For example, if the processor generates a scoring set that includes event segment 1 and non-event segment 1 from FIGS. 16A-B, the processor can also generate a corresponding training set that includes event segments 2-3 and non-event segments 2-3 from FIGS. 16A-B. As another example, if the processor generates a scoring set that includes event segment 1 and non-event segment 2 from FIGS. 16A-B, the processor can also generate a corresponding training set that includes event segments 2-3 and non-event segments 1 and 3 from FIGS. 16A-B. As yet another example, if the processor generates a scoring set that includes event segment 1 and non-event segment 3 from FIGS. 16A-B, the processor can also generate a corresponding training set that includes event segments 2-3 and non-event segments 1-2 from FIGS. 16A-B. This processor can iterate this to create training sets corresponding to each of the scoring sets.

At operation 1510, the processor selects a hyperparameter associated with the machine-learning model for which an optimal value is to be determined. This may involve identifying a group of hyperparameters associated with the machine-learning model and selecting a hyperparameter from among the group.

At operation 1511, the processor tunes a value for the hyperparameter. The processor may implement this operation at least in part by executing sub-operations 1512-1516.

At operation 1512, the processor generates test models based on the training sets and candidate values for the hyperparameters. A test model is a machine-learning model in which the hyperparameter is set to a candidate value. A candidate value is an optional value that is to be tested.

In some examples, the candidate values may fall within a particular range of values (e.g., 0.1-2.5). A user can explicitly select the particular range by inputting it into a GUI, or can implicitly select the particular range by setting a characteristic of the machine-learning model in the GUI (e.g., by selecting a complexity level for the machine-learning model, as discussed in greater detail below in relation to FIG. 24). Either way, the processor can receive the candidate values and use them to generate the test models in conjunction with the training sets. In alternative examples, the particular range may be a default range that is preprogrammed into the system.

Each test model can be generated using one of the training sets and one of the candidate values for the hyperparameter. For example, the processor may have previously generated a scoring set that includes event segment 1 and non-event segment 1 from FIGS. 16A-B, and a corresponding training set that includes event segments 2-3 and non-event segments 2-3 from FIGS. 16A-B. The processor can then use that training set to generate (e.g., train) a test model that has its hyperparameter value set to one of the candidate values.

At the end of this process, there may be N*C test models, where N is the total number of training sets and C is the total number of candidate values for the hyperparameter. For example, if there are 5 total training sets (N) and 6 total candidate values (C), there will be 30 test models.

At operation 1514, the processor determines a most-accurate test model among the test models. This may involve applying each scoring set to the test model that was generated using the training set corresponding to the scoring set. For example, the processor may have generated Scoring Set 1 and Training Set 1 (corresponding to Scoring Set 1). The processor can then use the Training Set 1 to generate Test Model 1 and Scoring Set 1 to determine the accuracy of Test Model 1. Similarly, the processor may previously generated Scoring Set 2 and Training Set 2 (corresponding to Scoring Set 2). The processor can then use the Training Set 2 to generate Test Model 2 and Scoring Set 2 to determine the accuracy of Test Model 2. And so on.

In some examples, the processor can use the scoring sets to determine an area under curve (AUC) score for each test model and compare them to one another to determine which of the test models is the most accurate. Alternatively, the processor can use the scoring sets to determine other accuracy metrics for the test models and compare them to one another to determine which of the test models is most accurate.

At operation 1516, the processor tunes the value for the hyperparameter to the candidate value that was used to generate the most-accurate test model, since this candidate value may be an optimal value. For instance, in one example there may be 6 candidate values, one of which is the value 1.73. If the value of 1.73 yielded the most-accurate test model among all of the test models, then the value of 1.73 can be selected as the value for the hyperparameter.

At operation 1518, the processor determines if there are any more hyperparameters with values to be tuned (e.g., optimized). If so, the process can return to operation 1510, at which point another hyperparameter can be selected and the process can be repeated for that hyperparameter. Otherwise, the process can end. After determining one or more hyperparameter values for one or more machine-learning models, the one or more machine-learning models can be generated using those hyperparameter values.

Referring back to FIG. 11, after generating the machine-learning models in the ensemble, the process can continue to operation 1108. At operation 1108, the processor receives new data 1122 and determines scores for the new data 1122 using the ensemble. The new data 1122 can include a new observation that is unknown to the machine-learning models in the ensemble (e.g., absent from the dataset and thus not used to train the machine-learning models in the ensemble). The scores can indicate a likelihood that the new data signifies the event. For example, a high score may indicate a high likelihood that the new data signifies the event, while a low score may indicate a low likelihood that the new data signifies the event.

Figure 17:
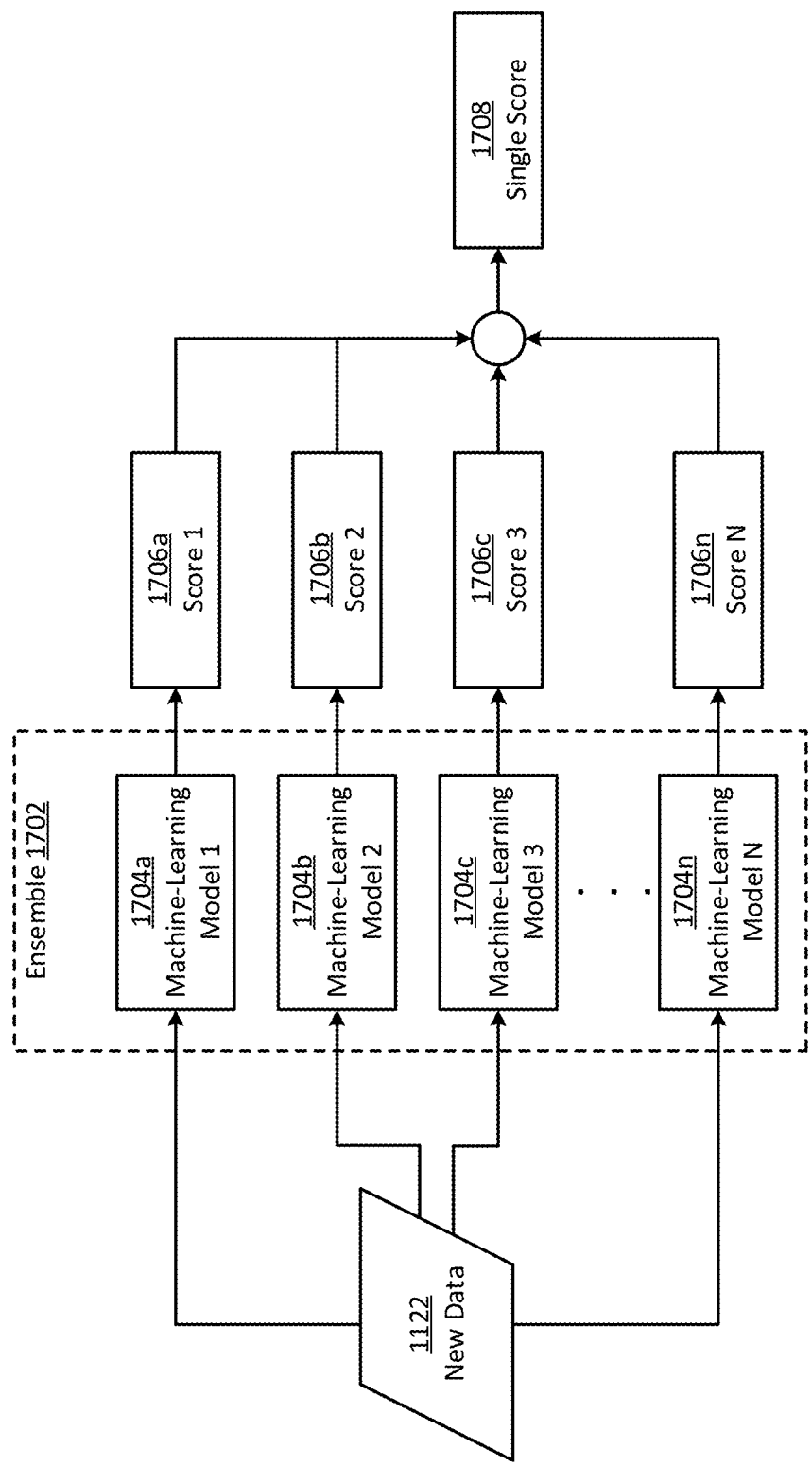
FIG. 17 depicts an example of scoring by machine-learning models in an ensemble according to some aspects.

The processor can determine the scores for the new data 1122 by feeding the new data 1122 as input to each of the machine-learning models in the ensemble. Each of the machine-learning models can provide a respective score for the new data 1122 as output. An example of this process is shown in FIG. 17, which depicts the new data 1122 being input into the machine-learning models 1704a-n forming the ensemble 1702 to obtain scores 1706a-n as outputs from the machine-learning models 1704a-n. Each of the machine-learning models 1704a-n provides a respective score as output. In some examples, a single score 1708 may then be determined based on the respective scores from the machine-learning models 1704a-n, as detailed below.

After determining the scores 1106a-n, the process of FIG. 11 can continue to operation 1110, in which the processor generates a single score for the new data 1122. This may involve averaging, adding, or performing another mathematical operation on the scores obtained from the machine-learning models. For example, the processor can average all of the scores obtained from the machine-learning models to determine a final, single score for the new data 1122.

The process next continues to operation 1112, in which the processor detects whether or not the new data 1122 is indicative of the event by comparing the single score to a score threshold. The user or the system may have set a score threshold. In some examples, the processor can compare the single score from the ensemble to the score threshold to determine whether the single score is greater than the score threshold. If so, the processor can determine that the new data 1122 indicates the event. Alternatively, the processor can compare the single score from the ensemble to the score threshold to determine whether the single score is less than the score threshold. If so, the processor can determine that the new data 1122 indicates the event. Whether an event is detected based on the single score being greater than or less than the score threshold can depend on the nature of the event under investigation and the configuration of the system.

At operation 1114, the processor outputs an indication associated with the event detection. For example, if the single score exceeded the score threshold, the processor can output an indication that the new data 1122 corresponds to the event. And if the single score is below the score threshold, the processor can output an indication that the new data 1122 does not correspond to the event. The indication can be textual, graphical, auditory, haptic, or any combination of these.

For example, the indication can include a textual, natural-language description as to why the new data 1122 was determined to indicate the event. One example of such a textual description 1800 is shown in FIG. 18 in relation to a fraud event. The textual description 1800 can include a list of reasons as to why the new data 112 was determined to indicate the event. The list of reasons may be provided in non-technical terms to aid non-technical users in understanding the results. The textual description 1800 can be generated using templates, which can be filled in using information determined during prior operations. For example, the templates can be filled in based on the importance of each variable (e.g., as determined in operation 1102), and based on the weight attributed to each variable by the machine-learning models in making decisions (e.g., as determined in operation 1106). Each sentence in the textual description can be generated by filling in a respective template for that sentence with the appropriate information.

In some examples, the indication can be output as an electronic communication transmitted over a network (e.g., a LAN or the Internet) to a client device associated with a user. For example, if new data 1122 is indicative of an event that is critical or time sensitive such as a cyber-attack, the processor can automatically transmit an alert to an administrator's device notifying the administrator of the event. This may enable the administrator to take immediate corrective action.

In some examples, the indication can also be output as part of a graphical user interface (GUI) that is accessible to a user. The GUI can enable the user to visually discern whether or not the new data 1122 corresponds to the event. The GUI can include charts, tables, and other visualizations to aid the user in interpreting the results. In some examples, the GUI includes the textual, natural-language description discussed above to aid non-technical users in understanding the results.

In some examples, the processor can automatically perform one or more operations based on the indication. For example, the processor can automatically block a user from accessing the system based on the indication. The processor can block the user, for instance, to inhibit a cyber-attack originating from the user. As another example, the processor can automatically lock an account associated with the event based on the indication. The processor can automatically lock the account, for instance, to prevent fraud or other unauthorized activity for taking place in relation to that account. As yet another example, the processor can automatically adjust a setting of a machine associated with the event based on the indication. The processor can automatically adjust the setting to, for instance, prevent an anomaly (e.g., a failure or improper shutdown) from occurring on the machine in the future.

Some examples of the present disclosure can further include a feedback process 1130 designed to continually improve the accuracy of the system. The feedback process 1130 can include operations 1118-1120. In operation 1118, the processor receives user feedback about the indication. For example, the user can provide user input specifying whether or not the indication is correct. The process then continue to operation 1120, in which the processor generates an additional observation (e.g., a new observation) based on the user feedback. For example, the processor can generate an additional observation that includes the new data 1122 and a flag value indicating whether the new data 1122 indicated the event, as determined based on the user feedback. The processor may then incorporate the additional observation into the dataset and iterate at least some of the process of FIG. 11 to update the ensemble. For example, the processor can repeat operations 1102-1106 based on at least some observations from the dataset and the additional observation, which can yield another set of machine-learning models collectively forming another ensemble. The processor can then compare the ensembles to one another to determine which of the ensembles is more accurate. For example, the processor can determine area under curve (AUC) scores for the ensembles and compare them to one another to determine which ensemble is more accurate. After determining which ensemble is more accurate, the processor can select the more accurate ensemble for use moving forward. Thus, the processor can update the original ensemble by replacing it with the alternative ensemble that is more accurate. But other examples may involve updating the ensemble in other ways, such as by retraining the existing machine-learning models therein based at least in part on the additional observation.

Some examples of the present disclosure can additionally or alternatively include an unsupervised learning process 1128 that is also designed to continually improve the accuracy of the system. The unsupervised learning process 1128 can include operations 1124-1126, which can generally involve using an unsupervised machine-learning model (UMLM) that is separate from the ensemble. Examples of the UMLM can include a clusterer or neural network. In some examples, the UMLM be trained using the observations that were obtained in block 1102.

In operation 1124, the processor can apply the new data 1122 as input to an unsupervised machine-learning model (UMLM) to detect whether or not the new data 1122 indicates the event. The UMLM can generate a score indicating the likelihood that the new data 1122 corresponds to the event. The UMLM can then compare the score to an event threshold. The event threshold may be different than the score threshold discussed above in relation to operation 1112 and may be configurable by the user. In one example, a score above the event threshold may indicate that the new data likely corresponds to the event, and a score below the event threshold may indicate that the new data likely does not correspond to the event. Or vice-versa. Either way, the UMLM can generate an output based on the comparison, with the output indicating whether or not the new data 1122 is indicative of the event.

The process then continue to operation 1126, in which the processor generates a new observation (e.g., an additional observation) based on the output from the UMLM. For example, the processor can generate a new observation that includes the new data 1122 and a flag value indicating whether the new data 1122 indicated the event, as determined based on the output from the UMLM. The processor may then incorporate the new observation into the dataset and iterate at least some of the process of FIG. 11 to update the ensemble (e.g., using any of the techniques discussed above).

In some examples, operations 1122-1126 can be performed before some of all of operations 1102-1120. For instance, there are circumstances in which the dataset will have an insufficient number of labeled observations to generate the ensemble. In such circumstances, the processor can apply the UMLM to unlabeled data (e.g., new data 1122) prior to generating the ensemble, in order to populate the dataset with a sufficient number of labeled observations to allow some or all of operations 1102-1120 to be suitably performed.

Figure 19:
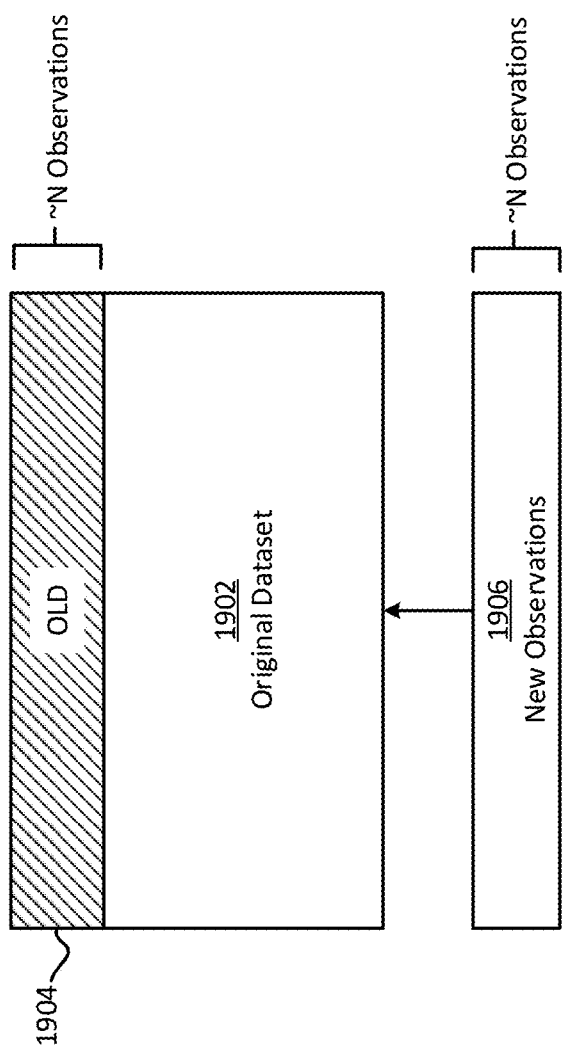
FIG. 19 depicts an example of updating a dataset according to some aspects.

In some examples, the processor can periodically update the dataset as new observations become available. One example of this process is shown in FIG. 19. As shown, the processor can periodically add new observations 1906 to the original dataset 1902 and remove older observations 1904 therefrom. The processor can remove about as many old observations 1904 as there are new observations 1906 being added, so that the total amount of observations in the dataset remains roughly the same. This can enable the dataset to remain up-to-date. The processor can also periodically retrain some or all of the machine-learning models in the ensemble using the updated dataset in some examples, so that the machine-learning models are kept up-to-date.

While the process of FIG. 11 is particularly suited for detecting rare events, the process can also be used to detect various other kinds of event, including events that are not rare. A user may be able to select an event to detect from among a group of event options and otherwise customize the process through an interactive GUI. The interactive GUI may simplify the process for non-technical users, and may enable the rapid deployment of an ensemble for detecting events while requiring minimal user input (e.g., just 6 mouse clicks). One example of such an interactive GUI is described below in relation to FIGS. 20-25. Each page of the interactive GUI discussed below in relation to FIGS. 20-25 can be generated by the processor and provided to the user.

FIG. 20 depicts an example of an interactive GUI 2000 in which a user can begin a new project according to some aspects. The GUI 2000 includes a list 2002 of existing projects. Each entry in the list 2002 includes the name of an existing project, the project's type (e.g., "machine learning"), and the project's target column (e.g., if each column in the dataset relates to a variable, the target column is the target variable to detect), a description of the project, an identifier of the target project, the last date on which the machine-learning models in the project were trained, and the user responsible for last training the machine-learning models. But other examples can involve entries with more, less, or different information.

The user may begin a new project by selecting a button 2004 (as shown by the arrow). In response to selecting the button 2004, the system may request a name for the new project. The user can enter the name for the new project and press another button to proceed to the next page of the GUI, an example of which is shown in FIG. 21.

In the example of FIG. 21, the GUI 2100 includes a list 2102 of datasets that are available for use. Each entry in the list 2102 includes a name for the dataset, a size of the dataset, and a last updated date indicating when the dataset was last updated. But other examples can involve entries with more, less, or different information. A user can select a desired dataset from the list 2102 (as shown by the arrow) and proceed to the next page of the GUI, an example of which is shown in FIG. 22.

Figure 22:
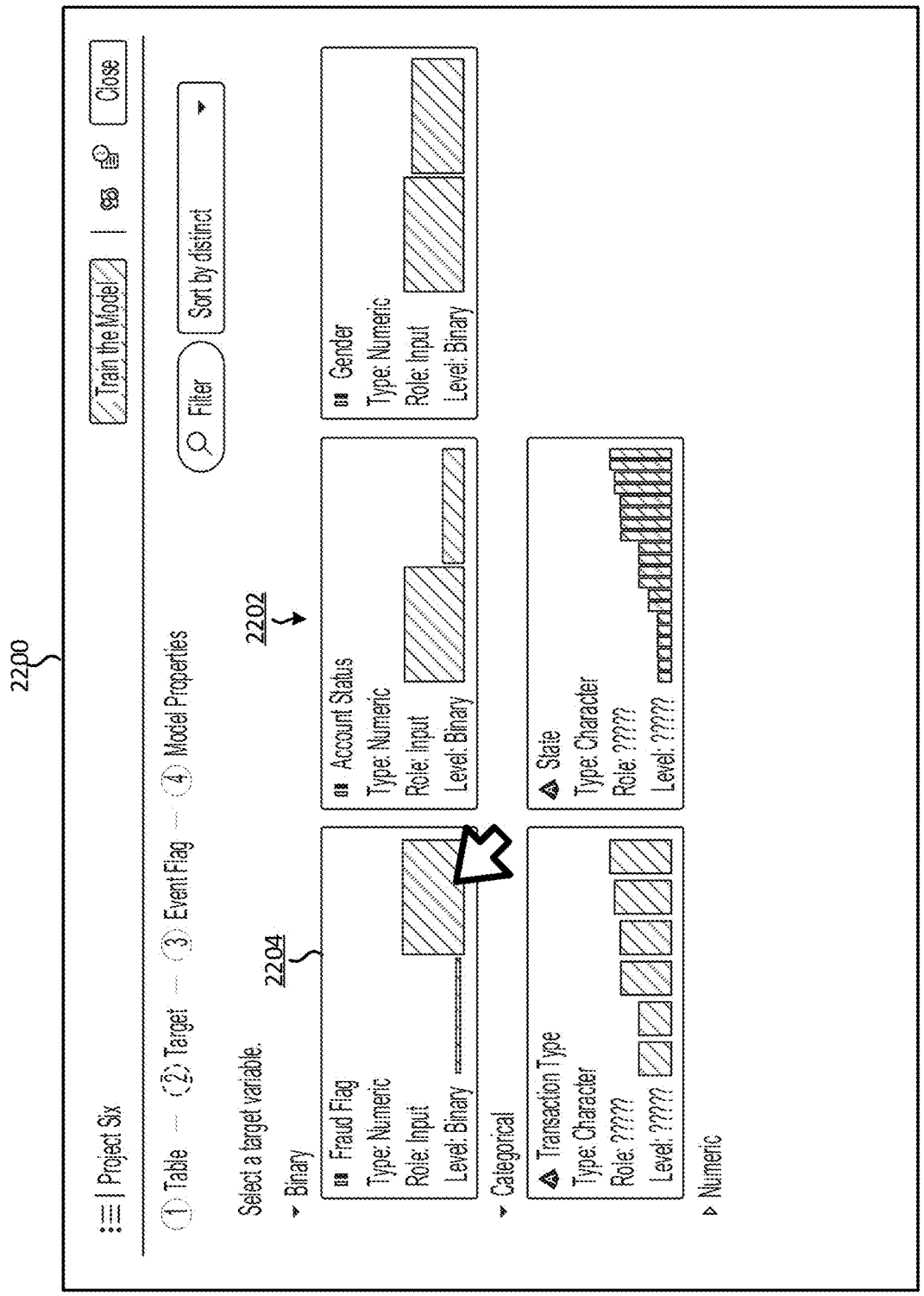
FIG. 22 depicts an example of another page in the interactive GUI in which the user can select an event group according to some aspects.

In the example of FIG. 22, the GUI 2200 includes a list 2202 of candidate target variables that are available for detection in the selected dataset. Each entry in the list 2202 can include a name for a candidate target variable, a type of the candidate target variable (e.g., "numeric" or "character"), a role of the candidate target variable (e.g., "input"), a level of the candidate target variable (e.g., "binary"), and an indication how many event observations and non-event observations are associated with the candidate target variable in the selected dataset. For example, each entry in FIG.

22 includes a candidate target variable and a bar chart depicting how many event observations and non-event observations are associated with the candidate target variable. This can enable a user to more information about the candidate target variable relatively quickly. For example, the large disproportion between event observations and non-event observations in entry 2204 can enable a user to discern relatively quickly that this candidate target variable is associated with a rare event. While FIG. 22 depicts each entry in the list 2202 having certain information, other examples can involve entries with more, less, or different information.

In some examples, the entries in the list 2202 can be categorized and displayed in the GUI 2200 by category. This can enable a user to easily locate desired entries in the list 2202. A user can then select a desired target variable from the list 2202 (as shown by the arrow) and proceed to the next page of the GUI, an example of which is shown in FIG. 23.

Figure 23:
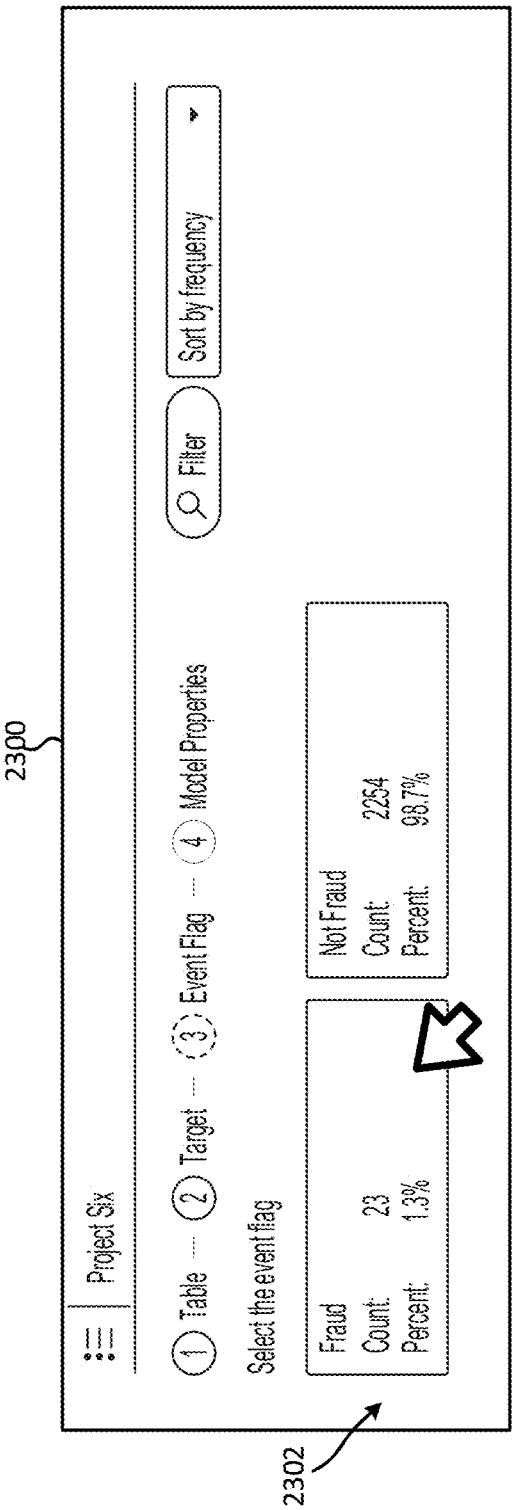
FIG. 23 depicts an example of another page in the interactive GUI in which the user can select a particular event in the event group according to some aspects.

In the example of FIG. 23, the GUI 2300 includes a list 2302 (e.g., a group) of event options associated with the selected target variable. Each entry in the list 2302 corresponds to an event option and includes a name of the event, a count of how many observations in the selected dataset indicate that event, and a percentage of the total number of observations in the selected dataset indicate that event. But other examples can involve entries with more, less, or different information. A user can select a desired event from the list 2302 (as shown by the arrow) and proceed to the next page of the GUI, an example of which is shown in FIG. 24.

Figure 24:
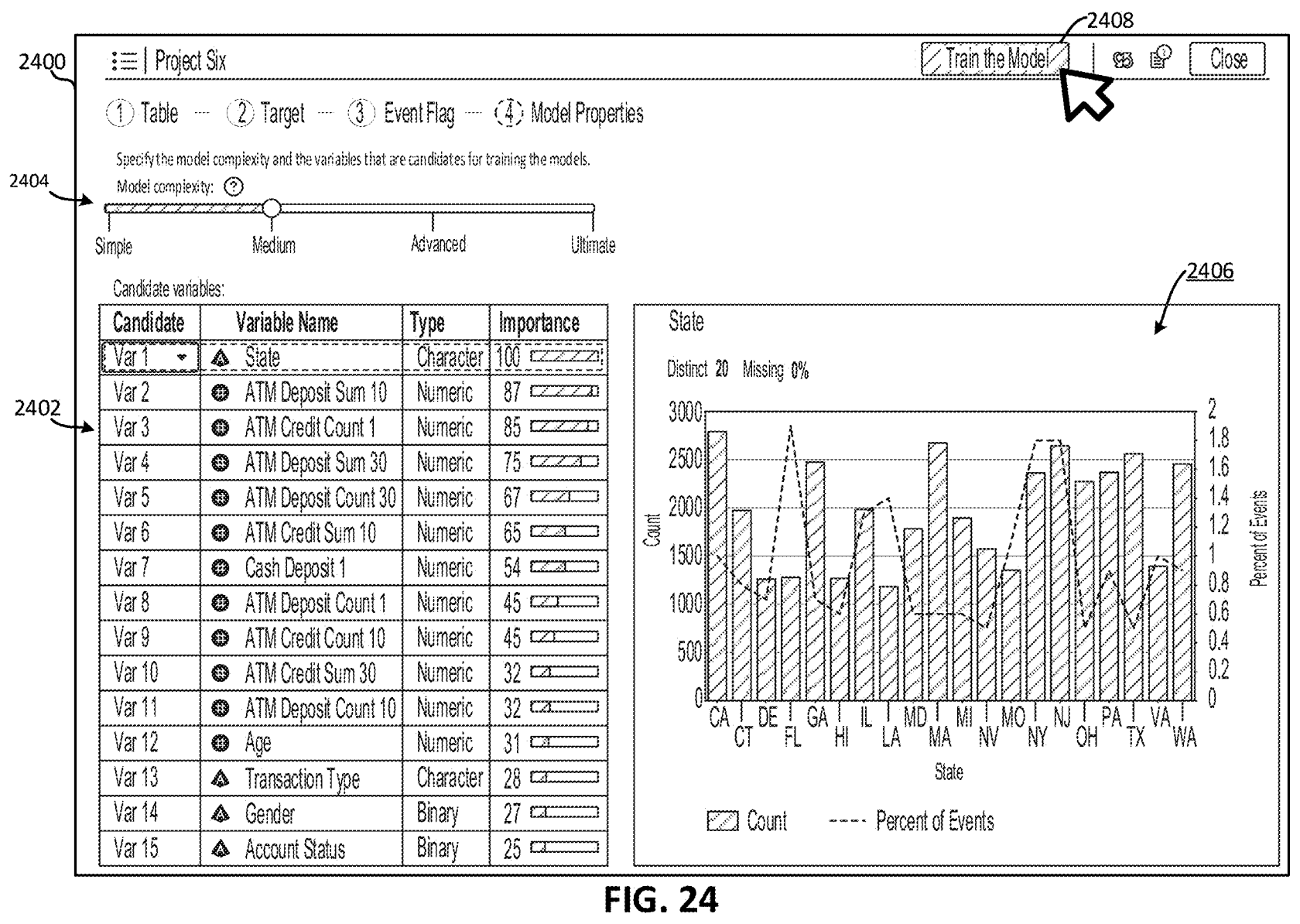

In the example of FIG. 24, the GUI 2400 includes a list 2402 of variables associated with the dataset. Each entry in the list 2402 can include a variable name, a type of the variable (e.g., "numeric," "character," or "binary"), and an importance score indicating an importance of the variable to detecting the selected event. The importance of each variable to detecting the selected event can be determined via a decision tree, for example as discussed above in relation to operation 1102 of FIG. 11. The list 2402 can enable a user to get a better understanding of what variables are important or unimportant for detecting the selected event.

In some examples, the GUI 2400 can also include an input object 2404 that enables a user to select a complexity level for one or more machine-learning models in an ensemble that will be generated to detect the selected event. In this example, the input object 2404 is a slider that ranges from "simple" to "ultimate" in terms of model complexity. But other examples can involve different types of input objects, such as radio buttons, input boxes, drop-down menus, etc.

The selected complexity level can control (e.g., dictate) the range of candidate values for hyperparameters used to generate machine-learning models in the ensemble. For example, a higher complexity level may correspond to a larger range of candidate values (e.g., 100 candidate values) being analyzed to determine an optimal value for at least one hyperparameter used to generate a machine-learning model in the ensemble. This may result in a more accurate machine-learning model but may also consume more computing resources. And a lower complexity level may correspond to a smaller range of candidate values (e.g., 10 candidate values) being analyzed to determine an optimal value for each hyperparameter used to generate a machine-learning model in the ensemble. This may result in a less accurate machine-learning model but may also consume fewer computing resources. Users can select the appropriate complexity level based on their desired accuracy level and computing resource constraints.

In some examples, the page GUI can also include a chart 2406 (e.g., a table, graph, or diagram) indicating a breakdown of event observations and non-event observations in the selected dataset. The observations in the selected dataset can be grouped into categories (e.g., states), which can be visualized in the chart 2406. The chart 2406 may specify the total number of observations in each category (e.g., state) in the dataset, may specify how many of those observations are event observations, or both. In the example of FIG. 24, the chart 2406 includes a bar chart providing the total number of observations by state, and a line graph overlaying the bar chart indicating a percentage of the observations by state that are event observations. This may enable a user to quickly visualize event observations by category. When ready, the user can select a button 2408 (as shown by the arrow) to generate the ensemble of machine-learning models. The system can respond to the button press by automatically generating the ensemble of machine-learning models using any of the processes discussed above (e.g., the processes of FIGS. 11-19). The system may then generate the next page of the GUI, an example of which is shown in FIG. 25.

Figure 25:
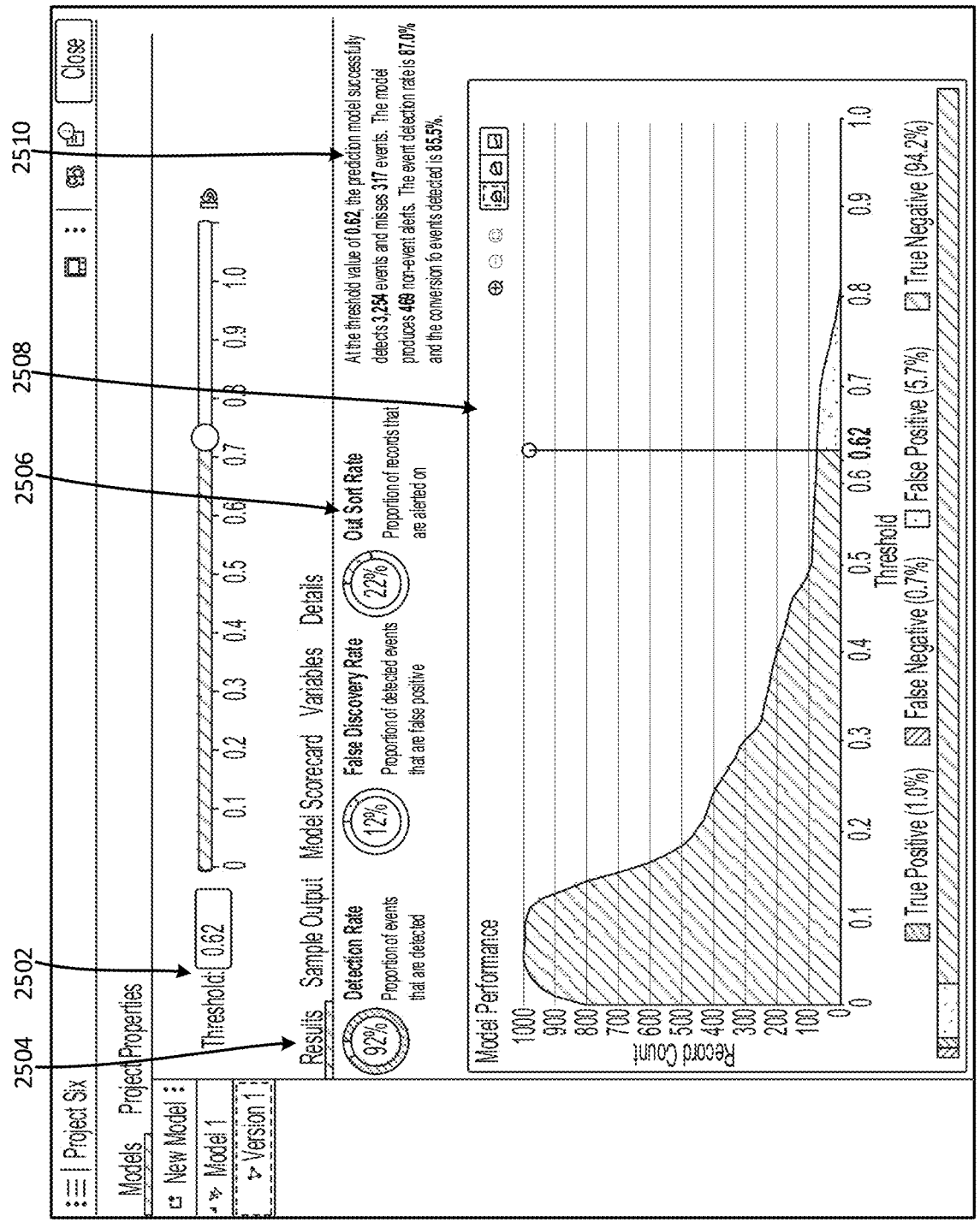
FIG. 25 depicts an example of another page in the interactive GUI providing metrics related to the machine-learning model according to some aspects.

In the example of FIG. 25, the GUI 2500 includes an input object 2502 that enables a user to select a threshold level (e.g., a score threshold) for comparison to outputs from the ensemble to detect the selected event. In this example, the input object 2502 is a slider that ranges from 0.0 to 1.1, where a lower threshold may yield more detected events and a higher threshold may yield fewer detected events. But other examples can involve different types of input objects, such as radio buttons, input boxes, drop-down menus, etc., which may span the same threshold-range or a different threshold-range. A user can customize the threshold level as desired to adjust the sensitivity of the system.

The GUI 2500 can also include a results tab 2504, which can convey performance metrics 2506 related to the ensemble to the user. In this example, the performance metrics 2506 include (i) a detection rate indicating the proportion of events that are detected, (ii) a false discovery rate indicating a rate of falsely detected events, and (iii) an out sort rate indicating the proportion of observations that are alerted on. But other examples can have more, fewer, or different performance metrics than these. The results tab 2504 can also include a textual description 2510 indicating various performance metrics when the threshold level is set to a particular value. For example, the textual description 2510 can include the number of successfully detected events, the number of missed events, the number of non-event alerts, the event detection rate, the conversion rate of detected events, or any combination of these, when the threshold level is set to a particular value. The textual description 2510 can be in a natural language form to aid non-technical users in understanding the performance metrics. In some examples, the results tab 2504 further (or alternatively) includes a chart 2508 indicating the performance metrics in relation to various threshold levels for the machine-learning models. The Y axis can indicate the number of observations associated with each performance metric and the X axis can indicate the threshold level that has been set for the ensemble. Examples of the performance metrics can include percentages of true positive detections, false negative detections, false positive detections, and true negative detections.

The GUI 2500 may also include other tabs that provide other information related to the ensemble for the user's consideration. Examples of the other tabs can include a "sample output" tab that may provide a sample of the outputs from the ensemble; a "model scorecard" tab that may provide a sample of model scores from the ensemble, a "variables" tab that may provide a listing of the variables considered by the ensemble; a "details" tab that may provide other relevant details about the ensemble; or any combination of these. A user can switch between the various tabs to receive the corresponding information, which may aid the user in making subsequent decisions related to the ensemble and/or the selected event.

While FIGS. 20-25 provide one exemplary GUI, other examples can have more, fewer, or different arrangements of the features discussed in relation to those figures. The specific features discussed above in relation to FIGS. 20-25 are not intended to be limiting, and can be rearranged or combined in any suitable manner.

In the previous description, specific details are set forth in order to provide a thorough understanding of examples of the technology for the purposes of explanation. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function.

Systems depicted in some of the figures can be provided in various configurations. In some examples, the systems can be configured as a distributed system where one or more components of the system are distributed across one or more networks in a cloud computing system.

The invention claimed is:

1. A system comprising:
a processor; and
a memory including instructions that are executable by the processor for causing the processor to:
generate a graphical user interface that includes a graphical object that is manipulatable by a user to select among a plurality of options dictating an amount of candidate numerical values to be used for a hyperparameter during a hyperparameter tuning process for at least one machine-learning model in an ensemble of machine-learning models, each option in the plurality of options corresponding to more or fewer candidate numerical values for the hyperparameter than the other options in the plurality of options;
obtain observations from a dataset, wherein all of the observations are labeled, each of the observations including respective values for variables and a flag value corresponding to an event;
incorporate noise values for a noise variable into the observations;
generate a decision tree based on the observations with the noise values;
determine importance scores for the variables using the decision tree;
include the importance scores in the graphical user interface;
generate a set of training partitions based on the observations, the set of training partitions including an event partition having all of the observations in which the flag value indicates the event, and the set of training partitions including non-event partitions having all of the observations in which the flag value does not indicate the event;
generate the ensemble of machine-learning models based on the set of training partitions and by implementing the hyperparameter tuning process using the amount of candidate numerical values corresponding to the selected option, each machine-learning model in the ensemble being generated using a respective set of training data formed from the event partition and one of the non-event partitions;
subsequent to generating the ensemble of machine-learning models, receive new data that is absent from the dataset;
detect whether the new data is indicative of the event using the ensemble by:
providing the new data as input to the ensemble of machine-learning models;
receiving respective scores associated with the new data as outputs from the machine-learning models in the ensemble;
combining the respective scores into a single score for the new data;
comparing the single score for the new data to a threshold level associated with the event; and
outputting an indication to a user of whether the new data is indicative of the event; and
subsequent to detecting whether the new data is indicative of the event, update the ensemble by:
providing the new data as input to an unsupervised machine-learning model that is separate from the ensemble of machine-learning models;
receiving an output from the unsupervised machine-learning model indicating whether or not the new data is indicative of the event;
incorporating a new observation into the dataset indicating whether or not the new data is indicative of the event based on the output from the unsupervised machine-learning model; and
updating the ensemble based on the dataset with the new observation.

2. The system of claim 1, wherein the memory further comprises instructions that are executable by the processor for causing the processor to remove at least one variable from the observations prior to generating the set of training partitions, by:
determining, based on the decision tree, that the at least one variable contributes to detection of the event less than the noise variable and responsively removing a respective value for the at least one variable from each of the observations.

3. The system of claim 1, wherein the memory further comprises instructions that are executable by the processor for causing the processor to generate a machine-learning model in the ensemble by:
  determining that the respective set of training data for the machine-learning model is to be generated based on the event partition and a particular non-event partition among the non-event partitions;
  dividing the event partition into a predefined number of segments to produce event segments;
  dividing the particular non-event partition into the predefined number of segments to produce non-event segments;
  generating scoring sets and training sets based on the event segments and the non-event segments, each of the scoring sets comprising one of the event segments and one of the non-event segments, and each of the training sets corresponding to a scoring set and comprising a remainder of the event segments and the non-event segments not used in the scoring set; and
  tune a value of the hyperparameter associated with the machine-learning model based on the scoring sets and the training sets.

4. The system of claim 3, wherein the memory further comprises instructions that are executable by the processor for causing the processor to tune the value of the hyperparameter based on the scoring sets and the training sets by:
  generating test models based on the training sets and a set of candidate numerical values for the hyperparameter associated with the selected option, each test model being generated using one of the training sets and a different candidate value selected from the set of candidate numerical values for the hyperparameter;
  determining accuracies of the test models by applying the scoring sets to the test models, each scoring set being applied to the test model that was generated using the training set corresponding to the scoring set;
  comparing the accuracies of the test models to determine a most-accurate test model among the test models; and
  tuning the value for the hyperparameter to a candidate numerical value used to generate the most-accurate test model.

5. The system of claim 1, wherein the memory further comprises instructions that are executable by the processor for causing the processor to:
  receive feedback from the user about whether or not the indication is correct; and
  generate an additional observation based on the feedback from the user;
  incorporate the additional observation into the dataset; and
  update the ensemble based on the dataset with the additional observation.

6. The system of claim 1, wherein combining the respective scores into the single score for the new data comprises averaging the respective scores to produce the single score for the new data.

7. The system of claim 1, wherein the memory further comprises instructions that are executable by the processor for causing the processor to:
  detect the event in relation to the new data using the ensemble of machine-learning models;
  determine a plurality of reasons as to why the event was detected in relation to the new data;
  determine a plurality of weights corresponding the reasons;
  in response to detecting the event in relation to the new data, generate a textual explanation about why the event was detected in relation to the new data by filling in fields of a predefined template with the plurality of reasons and the plurality of weights; and
  output the textual explanation in the graphical user interface.

8. The system of claim 1, wherein the memory further comprises instructions that are executable by the processor for causing the processor to generate the graphical user interface to include graphical objects through which the user can select (i) the event to be detected from among a group of event options, and (ii) the threshold level for detecting the event.

9. The system of claim 1, wherein the memory further comprises instructions that are executable by the processor for causing the processor to:
  periodically update the dataset by adding new observations to the dataset and removing old observations from the dataset; and
  periodically update the ensemble of machine-learning models based on the new observations.

10. The system of claim 1, wherein the memory further comprises instructions that are executable by the processor for causing the processor to generate the set of training partitions by dividing the observations into the event partition and the non-event partitions based on whether the flag value in the observations indicates the event or does not indicate the event, respectively.

11. The system of claim 1, wherein the threshold level is preselected by a user prior to the new data being provided as input to the ensemble of machine-learning models.

12. A method comprising:
  generating, by a processor, a graphical user interface that includes a graphical object that is manipulatable by a user to select among a plurality of options dictating an amount of candidate numerical values to be used for a hyperparameter during a hyperparameter tuning process for at least one machine-learning model in an ensemble of machine-learning models, each option in the plurality of options corresponding to more or fewer candidate numerical values for the hyperparameter than the other options in the plurality of options;
  obtaining, by the processor, observations from a dataset, wherein all of the observations are labeled, each of the observations including respective values for variables and a flag value corresponding to an event;
  incorporating, by the processor, noise values for a noise variable into the observations;
  generating, by the processor, a decision tree based on the observations with the noise values;
  determining, by the processor, importance scores for the variables using the decision tree;
  including, by the processor, the importance scores in the graphical user interface;
  generating, by the processor, a set of training partitions based on the observations, the set of training partitions including an event partition having all of the observations in which the flag value indicates the event, and the set of training partitions including non-event partitions having all of the observations in which the flag value does not indicate the event;
  generating, by the processor, the ensemble of machine-learning models based on the set of training partitions and by implementing the hyperparameter tuning process using the amount of candidate numerical values corresponding to the selected option, each machine-learning model in the ensemble being generated using a respective set of training data formed from the event partition and one of the non-event partitions;

subsequent to generating the ensemble of machine-learning models, receiving, by the processor, new data that is absent from the dataset;

detecting, by the processor, whether the new data is indicative of the event using the ensemble by:
  providing the new data as input to the ensemble of machine-learning models;
  receiving respective scores associated with the new data as outputs from the machine-learning models in the ensemble;
  combining the respective scores into a single score for the new data;
  comparing the single score for the new data to a threshold level associated with the event; and
  outputting an indication to a user of whether the new data is indicative of the event; and subsequent to detecting whether the new data is indicative of the event, updating, by the processor, the ensemble by:
  providing the new data as input to an unsupervised machine-learning model that is separate from the ensemble of machine-learning models;
  receiving an output from the unsupervised machine-learning model indicating whether or not the new data is indicative of the event;
  incorporating a new observation into the dataset indicating whether or not the new data is indicative of the event based on the output from the unsupervised machine-learning model; and
  updating the ensemble based on the dataset with the new observation.

13. The method of claim 12, further comprising removing at least one variable from the observations prior to generating the set of training partitions, by:
  determining, based on the decision tree, that the at least one variable contributes to detection of the event less than the noise variable and responsively removing a respective value for the at least one variable from each of the observations.

14. The method of claim 12, further comprising generating a machine-learning model in the ensemble by:
  determining that the respective set of training data for the machine-learning model is to be generated based on the event partition and a particular non-event partition among the non-event partitions;
  dividing the event partition into a predefined number of segments to produce event segments;
  dividing the particular non-event partition into the predefined number of segments to produce non-event segments;
  generating scoring sets and training sets based on the event segments and the non-event segments, each of the scoring sets comprising one of the event segments and one of the non-event segments, and each of the training sets corresponding to a scoring set and comprising a remainder of the event segments and the non-event segments not used in the scoring set; and
  tune a value of the hyperparameter associated with the machine-learning model based on the scoring sets and the training sets.

15. The method of claim 14, further comprising tuning the value of the hyperparameter based on the scoring sets and the training sets by:
  generating test models based on the training sets and a set of candidate numerical values for the hyperparameter associated with the selected option, each test model being generated using one of the training sets and a different candidate value selected from the set of candidate numerical values for the hyperparameter;
  determining accuracies of the test models by applying the scoring sets to the test models, each scoring set being applied to the test model that was generated using the training set corresponding to the scoring set;
  comparing the accuracies of the test models to determine a most-accurate test model among the test models; and
  tuning the value for the hyperparameter to a candidate numerical value used to generate the most-accurate test model.

16. The method of claim 12, further comprising
  receiving feedback from the user about whether or not the indication is correct; and
  generating an additional observation based on the feedback from the user;
  incorporating the additional observation into the dataset; and
  updating the ensemble based on the dataset with the additional observation.

17. The method of claim 12, wherein combining the respective scores into the single score for the new data comprises averaging the respective scores to produce the single score for the new data.

18. The method of claim 12, further comprising:
  detecting the event in relation to the new data using the ensemble of machine-learning models;
  determining a plurality of reasons as to why the event was detected in relation to the new data;
  determining a plurality of weights corresponding the reasons;
  in response to detecting the event in relation to the new data, generating a textual explanation about why the event was detected in relation to the new data by filling in fields of a predefined template with the plurality of reasons and the plurality of weights; and
  outputting the textual explanation in the graphical user interface.

19. The method of claim 12, further comprising to generating the graphical user interface to include graphical objects through which the user can select (i) the event to be detected from among a group of event options, and (ii) the threshold level for detecting the event.

20. The method of claim 12, further comprising:
  periodically updating the dataset by adding new observations to the dataset and removing old observations from the dataset; and
  periodically updating the ensemble of machine-learning models based on the new observations.

21. A non-transitory computer-readable medium comprising program code that is executable by a processor for causing the processor to:
  generate a graphical user interface that includes a single graphical object that is manipulatable by a user to select among a plurality of options dictating an amount of candidate numerical values to be used for at least two hyperparameters during a hyperparameter tuning process for at least one machine-learning model in an ensemble of machine-learning models, each option in the plurality of options corresponding to more or fewer candidate numerical values for the at least two hyperparameters than the other options in the plurality of options;

obtain observations from a dataset, wherein all of the observations are labeled, each of the observations including respective values for variables and a flag value corresponding to an event;

generate a set of training partitions based on the observations, the set of training partitions including an event partition having all of the observations in which the flag value indicates the event, and the set of training partitions including non-event partitions having all of the observations in which the flag value does not indicate the event;

generate the ensemble of machine-learning models based on the set of training partitions and by implementing the hyperparameter tuning process using the amount of candidate numerical values corresponding to the selected option, each machine-learning model in the ensemble being generated using a respective set of training data formed from the event partition and one of the non-event partitions;

subsequent to generating the ensemble of machine-learning models, receive new data that is absent from the dataset;

detect whether the new data is indicative of the event using the ensemble by:
 providing the new data as input to the ensemble of machine-learning models;
 receiving respective scores associated with the new data as outputs from the machine-learning models in the ensemble;
 combining the respective scores into a single score for the new data;
 comparing the single score for the new data to a threshold level associated with the event; and
 outputting an indication to a user of whether the new data is indicative of the event; and subsequent to detecting whether the new data is indicative of the event, update the ensemble by:
 providing the new data as input to an unsupervised machine-learning model that is separate from the ensemble of machine-learning models;
 receiving an output from the unsupervised machine-learning model indicating whether or not the new data is indicative of the event;
 incorporating a new observation into the dataset indicating whether or not the new data is indicative of the event based on the output from the unsupervised machine-learning model; and
 updating the ensemble based on the dataset with the new observation.

22. The non-transitory computer-readable medium of claim 21, further comprising program code that is executable by the processor for causing the processor to:
 remove at least one variable from the observations prior to generating the set of training partitions, by:
  incorporating noise values for a noise variable into the observations;
  generating a decision tree based on the observations with the noise values; and
  determining, based on the decision tree, that the at least one variable contributes to detection of the event less than the noise variable and responsively removing a respective value for the at least one variable from each of the observations;
  determine importance scores for the variables using the decision tree; and
  include the importance scores in the graphical user interface.

23. The non-transitory computer-readable medium of claim 21, further comprising program code that is executable by the processor for causing the processor to generate a machine-learning model in the ensemble by:
 determining that the respective set of training data for the machine-learning model is to be generated based on the event partition and a particular non-event partition among the non-event partitions;
 dividing the event partition into a predefined number of segments to produce event segments;
 dividing the particular non-event partition into the predefined number of segments to produce non-event segments;
 generating scoring sets and training sets based on the event segments and the non-event segments, each of the scoring sets comprising one of the event segments and one of the non-event segments, and each of the training sets corresponding to a scoring set and comprising a remainder of the event segments and the non-event segments not used in the scoring set; and
 tune a value of a hyperparameter associated with the machine-learning model based on the scoring sets and the training sets.

24. The non-transitory computer-readable medium of claim 23, further comprising program code that is executable by the processor for causing the processor to tune the value of the hyperparameter based on the scoring sets and the training sets by:
 generating test models based on the training sets and a set of candidate numerical values for the hyperparameter associated with the selected option, each test model being generated using one of the training sets and a different candidate value selected from the set of candidate numerical values for the hyperparameter;
 determining accuracies of the test models by applying the scoring sets to the test models, each scoring set being applied to the test model that was generated using the training set corresponding to the scoring set;
 comparing the accuracies of the test models to determine a most-accurate test model among the test models; and
 tuning the value for the hyperparameter to a candidate numerical value used to generate the most-accurate test model.

25. The non-transitory computer-readable medium of claim 21, further comprising program code that is executable by the processor for causing the processor to:
 receive feedback from the user about whether or not the indication is correct; and
 generate an additional observation based on the feedback from the user;
 incorporate the additional observation into the dataset; and
 update the ensemble based on the dataset with the additional observation.

26. The non-transitory computer-readable medium of claim 21, wherein combining the respective scores into the single score for the new data comprises averaging the respective scores to produce the single score for the new data.

27. The non-transitory computer-readable medium of claim 21, further comprising program code that is executable by the processor for causing the processor to:

detect the event in relation to the new data using the ensemble of machine-learning models;
determine a plurality of reasons as to why the event was detected in relation to the new data;
determine a plurality of weights corresponding the reasons;
generate a textual explanation about why the event was detected in relation to the new data by filling in fields of a predefined template with the plurality of reasons and the plurality of weights; and
output the textual explanation in the graphical user interface.

28. The non-transitory computer-readable medium of claim 21, further comprising program code that is executable by the processor for causing the processor to generate the graphical user interface to include graphical objects through which the user can select (i) the event to be detected from among a group of event options, and (ii) the threshold level for detecting the event.

29. The non-transitory computer-readable medium of claim 21, further comprising program code that is executable by the processor for causing the processor to:
periodically update the dataset by adding new observations to the dataset and removing old observations from the dataset; and
periodically update the ensemble of machine-learning models based on the new observations.

30. The non-transitory computer-readable medium of claim 21, wherein the dataset is a historical dataset obtained during a prior timespan.

* * * * *